(12) United States Patent
Pallamreddy et al.

(10) Patent No.: US 9,569,193 B2
(45) Date of Patent: Feb. 14, 2017

(54) SYSTEM AND METHOD FOR PATCHING JAVA CLOUD SERVICES FOR USE WITH A CLOUD COMPUTING ENVIRONMENT

(71) Applicant: Oracle International Corporation, Redwood Shores, CA (US)

(72) Inventors: Prasanth Pallamreddy, Fremont, CA (US); Naresh Revanuru, Fremont, CA (US); William Arthur Jackson, III, Portland, OR (US); Nilesh P. Junnarkar, Palo Alto, CA (US)

(73) Assignee: ORACLE INTERNATIONAL CORPORATION, Redwood Shores, CA (US)

( * ) Notice: Subject to any disclaimer, the term of this patent is extended or adjusted under 35 U.S.C. 154(b) by 0 days.

(21) Appl. No.: 14/011,657

(22) Filed: Aug. 27, 2013

(65) Prior Publication Data

US 2014/0075427 A1   Mar. 13, 2014

Related U.S. Application Data

(60) Provisional application No. 61/798,646, filed on Mar. 15, 2013, provisional application No. 61/698,454, filed on Sep. 7, 2012, provisional application No. 61/698,461, filed on Sep. 7, 2012.

(51) Int. Cl.
  *G06F 9/44* (2006.01)
  *G06F 9/445* (2006.01)

(52) U.S. Cl.
  CPC ........................................ *G06F 8/65* (2013.01)

(58) Field of Classification Search
  CPC ................ G06F 8/60; G06F 8/61; G06F 8/65
  USPC ................................................ 717/168–178
  See application file for complete search history.

(56) References Cited

U.S. PATENT DOCUMENTS

| | | | |
|---|---|---|---|
| 7,562,356 B2* | 7/2009 | DeFolo | 717/169 |
| 7,984,434 B1* | 7/2011 | Gathoo | 717/170 |
| 8,291,407 B2* | 10/2012 | Greenwood et al. | 717/174 |
| 2006/0064685 A1* | 3/2006 | DeFolo | 717/169 |
| 2008/0162660 A1* | 7/2008 | Becker | 709/213 |

(Continued)

OTHER PUBLICATIONS

Hoff, "Patching the Cloud?," <http://www.rationalsurvivability.com/blog/2008/10/patching-the-cloud/>, Oct. 25, 2008, p. 1-9.*

(Continued)

*Primary Examiner* — Qing Chen
(74) *Attorney, Agent, or Firm* — Tucker Ellis LLP

(57) ABSTRACT

A system and method for patching cloud services for use with a cloud computing environment. In accordance with an embodiment, a cloud environment includes a cloud services infrastructure, which allows a suite of software applications, middleware, and database offerings to be delivered to customers in a self-service, elastically scalable manner. Over time, it may become necessary to update one or more of the deployed services. In accordance with an embodiment, services can be patched using a two phase approach. During an offline phase, patches are used to update shared components, such as middleware volumes, without disrupting any currently running services. Subsequently, during an online phase, patched components are enabled on all service hosts, and any necessary domain update/upgrade operations are invoked.

20 Claims, 21 Drawing Sheets

(56) References Cited

U.S. PATENT DOCUMENTS

2008/0295086 A1* 11/2008 Greenwood et al. .......... 717/168
2009/0254552 A1* 10/2009 Vinberg et al. .................. 707/6
2013/0263104 A1* 10/2013 Baset et al. ................... 717/168

OTHER PUBLICATIONS

Zhou et al., "Always Up-to-date—Scalable Offline Patching of VM Images in a Compute Cloud," Dec. 2010, ACM, p. 377-386.*
Shafii, Reza, "Oracle Java Cloud Service—A Public Cloud for Real World Enterprise Applications," <https://blogs.oracle.com/rezashafii/entry/oracle_java_cloud_service_a>, Oct. 7, 2011, p. 1-7.*
Eisele, Markus, "Oracle WebLogic Java Cloud Service—Behind the scenes," <http://www.javacodegeeks.com/2011/10/oracle-weblogic-java-cloud-service.html>, Oct. 13, 2011, p. 1-3.*
"Oracle Solaris ZFS Administration Guide," <http://docs.oracle.com/cd/E19253-01/819-5461/zfsover-2/>, 2010, p. 1-2.*
Thanawala, et al., Oracle SaaS Platform: Building On-Demand Applications; An Oracle White Paper, Sep. 2008, 21 pages.
Piech, Platform-as-a-Service Private Cloud with Oracle Fusion Middleware, An Oracle White Paper, Oct. 2009, 20 pages.
Unknown Author, Cost Effective Security and Compliance with Oracle Database 11g Release 2, An Oracle White Paper, Mar. 2011, 14 pages.
Joshi, et al., Bridging the Divide between SaaS and Enterprise Datacenters, An Oracle White Paper, Feb. 2010, 18 pages.
McKendrick, Privatizing the Cloud, Oct. 2010, 33 pages, IOUG Survey on Cloud Computing.
Glas, et al., Achieving the Cloud Computing Vision, An Oracle White Paper in Enterprise Architecture, Oct. 2010, 22 pages.
Venkataraman, et al., Oracle's Cloud Solutions for Public Sector, An Oracle White Paper, Apr. 2011, 28 pages.
Unknown Author, Creating a Self-Service Dev/Test Cloud, A Case Study from Oracle Product Development IT, An Oracle White Paper, Jul. 2011, 12 pages.
Unknown Author, Oracle Exadata Database Machine, Security Overview, 2011, 2 pages.
Chauhan, et al., On-Demand Sourcing: Driving Costs Down and Value Up in a Period of Increased Business Volatility, Jun. 11, 2010, 5 pages.
Unknown Author, Oracle Identity Management 11g, 2010, 4 pages.
Silverstein, et al., Architectural Strategies for IT Optimization: From Silos to Clouds, An Oracle White Paper on Enterprise Architecture, May 2010, 21 pages.
Unknown Author, Oracle Optimized Solution for Enterprise Cloud Infrastructure, An Oracle Technical White Paper, Jun. 2011, 32 pages.
Wang, Oracle Cloud Computing, An Oracle White Paper, Jun. 2011, 16 pages.
Gulati, Cloud Management Using Oracle Enterprise Manager 11g, An Oracle White Paper, Apr. 2010, 25 pages.
Unknown Author, Accelerating Enterprise Cloud Infrastructure Deployments, 2011, 4 pages.
Wahl, et al., Oracle Advanced Security with Oracle Database 11g Release 2, Oracle White Paper, Oct. 2010, 12 pages.
Unknown Author, Reduce TCO and Get More Value from your X86 Infrastructure, 2011, 4 pages.
Unknown Author, Oracle Offers ISVs Comprehensive Platform to Deliver SaaS Applications, 2008, 2 pages.
Kumar, et al., The Most Complete and Integrated Virtualization: From Desktop to Datacenter, An Oracle White Paper, Oct. 2010, 13 pages.

* cited by examiner

SYSTEM AND METHOD FOR PATCHING JAVA CLOUD SERVICES FOR USE WITH A CLOUD COMPUTING ENVIRONMENT

CLAIM OF PRIORITY

This application claims the benefit of priority to U.S. Provisional Patent Application titled "SYSTEM AND METHOD FOR PATCHING JAVA™ CLOUD SERVICES FOR USE WITH A CLOUD COMPUTING ENVIRONMENT", Application No. 61/798,646, filed Mar. 15, 2013; U.S. Provisional Patent Application titled "SYSTEM AND METHOD FOR PROVIDING A CLOUD COMPUTING ENVIRONMENT", Application No. 61/698,454, filed Sep. 7, 2012; and U.S. Provisional Patent Application titled "SYSTEM AND METHOD FOR PROVIDING A CLOUD COMPUTING ENVIRONMENT", Application No. 61/698,461, filed Sep. 7, 2012, each of which above applications are herein incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

FIELD OF INVENTION

Embodiments of the invention are generally related to cloud computing environments, and in particular systems and methods for patching Java cloud services for use with a cloud computing environment.

BACKGROUND

The term "cloud computing" is generally used to describe a computing model which enables on-demand access to a shared pool of computing resources, such as computer networks, servers, software applications, and services, and which allows for rapid provisioning and release of resources with minimal management effort or service provider interaction.

A cloud computing environment (sometimes referred to as a cloud environment, or a cloud) can be implemented in a variety of different ways to best suit different requirements. For example, in a public cloud environment, the underlying computing infrastructure is owned by an organization that makes its cloud services available to other organizations or to the general public. In contrast, a private cloud environment is generally intended solely for use by, or within, a single organization. A community cloud is intended to be shared by several organizations within a community; while a hybrid cloud comprise two or more types of cloud (e.g., private, community, or public) that are bound together by data and application portability.

Generally, a cloud computing model enables some of those responsibilities which previously may have been previously provided by an organization's own information technology department, to instead be delivered as service layers within a cloud environment, for use by consumers (either within or external to the organization, according to the cloud's public/private nature). Depending on the particular implementation, the precise definition of components or features provided by or within each cloud service layer can vary, but common examples include:

Software as a Service (SaaS), in which consumers use software applications that are running upon a cloud infrastructure, while a SaaS provider manages or controls the underlying cloud infrastructure and applications.

Platform as a Service (PaaS), in which consumers can use software programming languages and development tools supported by a PaaS provider to develop, deploy, and otherwise control their own applications, while the PaaS provider manages or controls other aspects of the cloud environment (i.e., everything below the run-time execution environment).

Infrastructure as a Service (IaaS), in which consumers can deploy and run arbitrary software applications, and/or provision processing, storage, networks, and other fundamental computing resources, while an IaaS provider manages or controls the underlying physical cloud infrastructure (i.e., everything below the operating system layer).

The above examples are provided to illustrate some of the types of environment within which embodiments of the invention can generally be used. In accordance with various embodiments, the systems and methods described herein can also be used with other types of cloud or computing environments.

SUMMARY

Described herein is a system and method for patching JAVA™ cloud services for use with a cloud computing environment. In accordance with an embodiment, a cloud environment, such as ORACLE™ Public Cloud (OPC), includes a JAVA™ cloud services (JCS) infrastructure, which allows a suite of software applications, middleware, and database offerings to be delivered to customers in a self-service, elastically scalable manner. (Oracle and Java are registered trademarks of Oracle and/or its affiliates.) Over time, it may become necessary to update one or more of the deployed services. In accordance with an embodiment, services can be patched using a two phase approach. During an offline phase, patches are used to update shared components, such as middleware volumes, without disrupting any currently running Java services. Subsequently, during an online phase, patched components are enabled on all Java service hosts, and any necessary domain update/upgrade operations are invoked.

DETAILED DESCRIPTION

As described above, a cloud computing environment (cloud environment, or cloud) can be implemented in a variety of different ways to best suit different requirements: for example, public cloud, private cloud, community cloud, or hybrid cloud. A cloud computing model enables some of those responsibilities which previously may have been previously provided by an organization's own information technology department, to instead be delivered as service layers within a cloud environment, for use by consumers (either within or external to the organization, according to the cloud's public/private nature).

Described herein are a variety of hardware and/or software components and features, which can be used in delivering an infrastructure, platform, and/or applications to support cloud computing environments. In accordance with various embodiments, the system can also utilize hardware and software such as Oracle Exalogic and/or Exadata machines, WebLogic and/or Fusion Middleware, and other hardware and/or software components and features, to provide a cloud computing environment which is enterprise-grade, enables a platform for development and deploying applications, provides a set of enterprise applications built on modern architecture and use cases, and/or provides flexible consumption choices.

Figure 1:
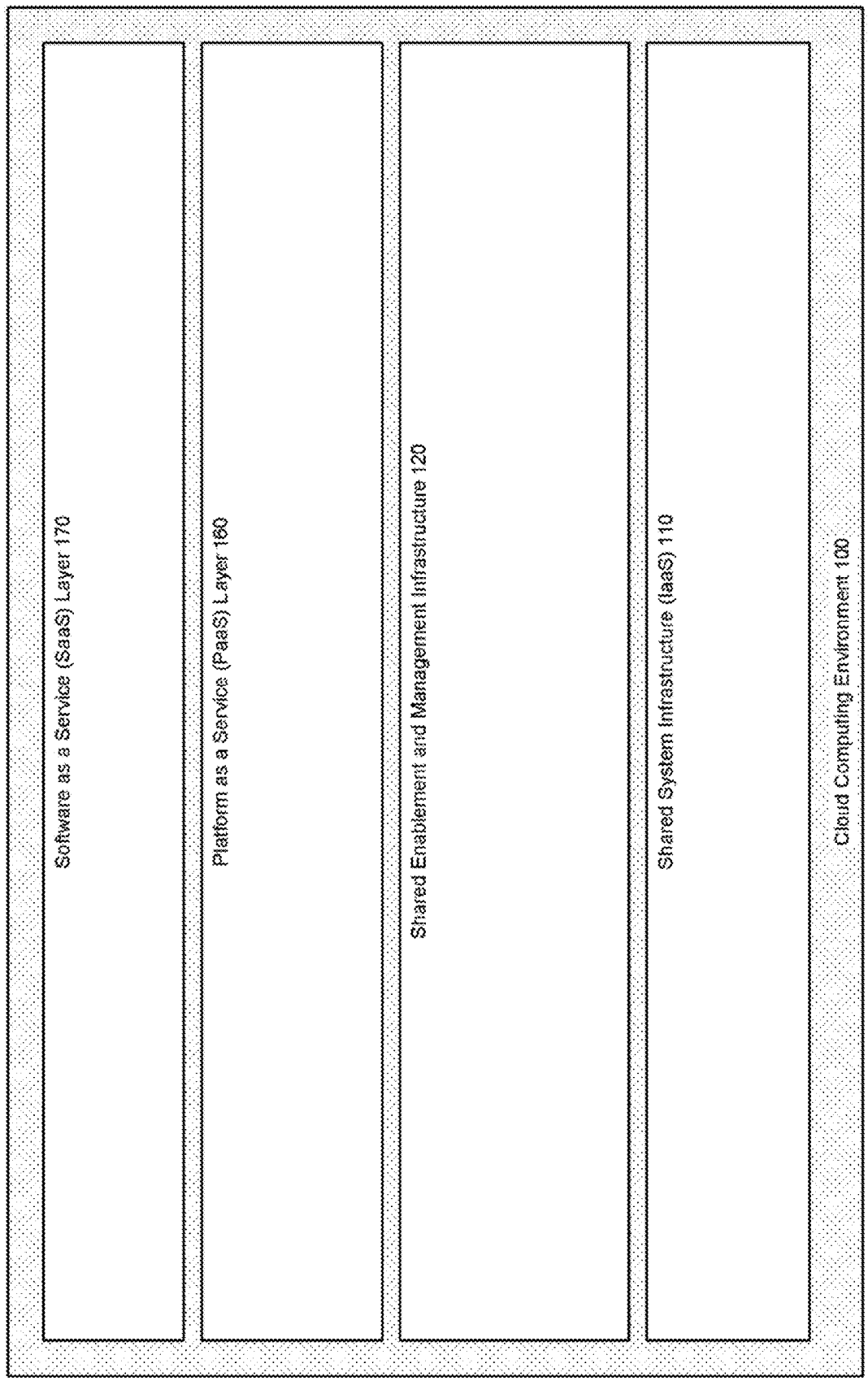
FIG. 1 illustrates a cloud computing environment including service layers, in accordance with an embodiment.

FIG. 1 illustrates a cloud computing environment including service layers, in accordance with an embodiment. As shown in FIG. 1, in accordance with an embodiment, a cloud computing environment (cloud environment, or cloud) 100 can generally include a combination of one or more Infrastructure as a Service (IaaS) layer 110, Platform as a Service (PaaS) layer 160, and/or Software as a Service (SaaS) layer 170, each of which are delivered as service layers within the cloud environment, and which can be used by consumers within or external to the organization, depending on the particular cloud computing model being used.

In accordance with an embodiment, the cloud computing environment can be implemented as a system that includes one or more conventional general purpose or specialized digital computers, computing devices, machines, microprocessors, memory and/or computer readable storage media, for example the computer hardware, software, and resources provided by Oracle Exalogic, Exadata, or similar machines.

As further shown in FIG. 1, in accordance with an embodiment, the cloud computing environment can include a shared enablement and management infrastructure 120, which is described in further detail below, and which provides enablement and management tools that can be used to support the various service layers.

The example shown in FIG. 1 is provided as an illustration of a type of cloud computing environment in which embodiments of the invention can generally be used. In accordance with various embodiments, the systems and methods described herein can also be used with different and/or other types of cloud or computing environments.

Figure 2:
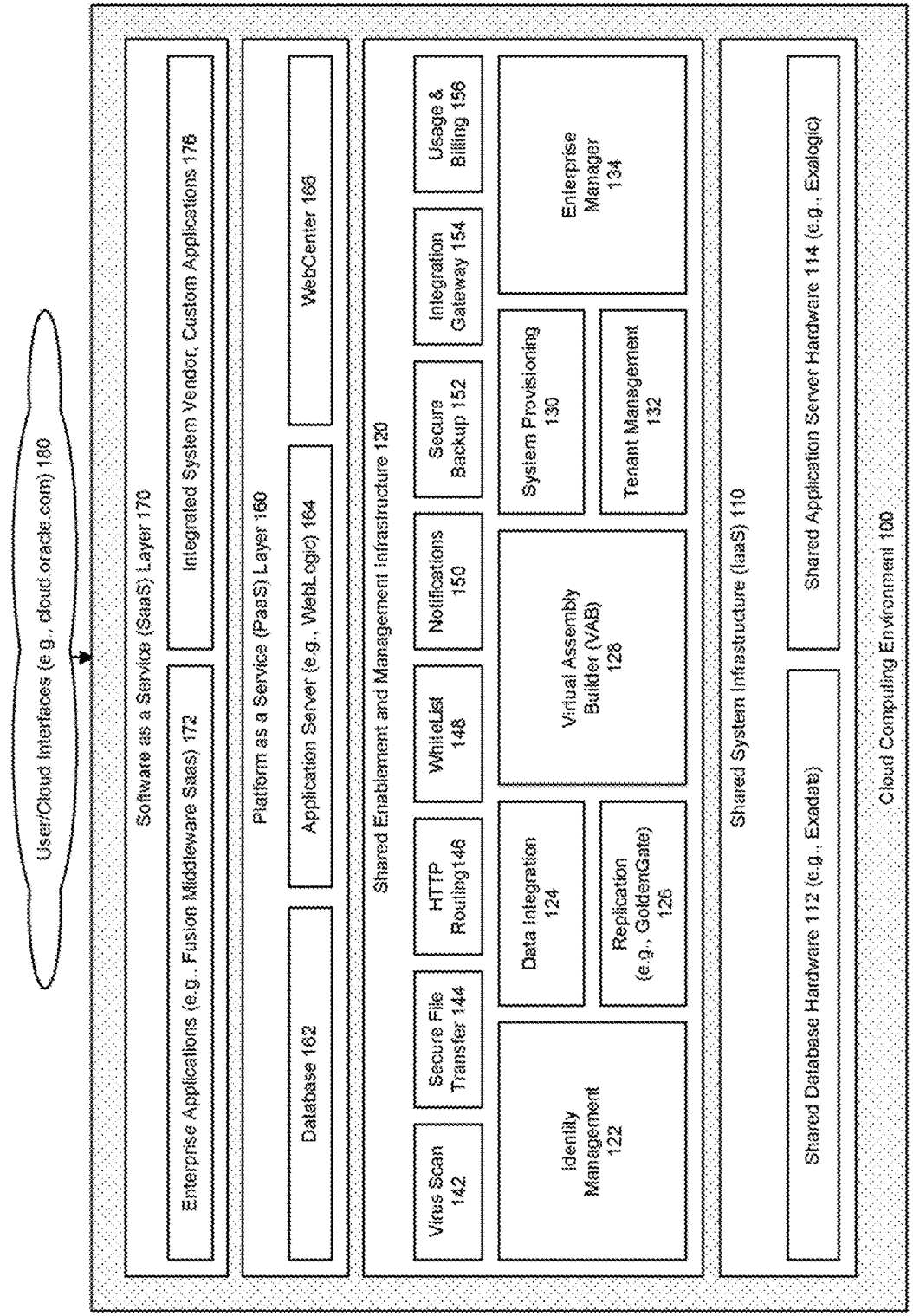
FIG. 2 further illustrates an environment, in accordance with an embodiment.

FIG. 2 further illustrates an environment, in accordance with an embodiment. As shown in FIG. 2, in accordance with an embodiment, each of the IaaS, PaaS, and/or SaaS layers can generally include a variety of components. For example, in accordance with an embodiment, the IaaS layer can include a shared database hardware (e.g., an Exadata machine) 112, and/or a shared application server hardware (e.g., an Exalogic machine). The PaaS layer can include one or more PaaS services, such as a database service 162, application service 164, and/or WebCenter service 166. The SaaS layer can include various SaaS services, such as enterprise applications (e.g., Oracle Fusion SaaS) 172, and/or ISV or custom applications 176, that can be accessed by one or more user/cloud interfaces 180.

As described above, in accordance with an embodiment, the cloud computing environment can also include a shared enablement and management infrastructure. For example, as shown in FIG. 2, the shared enablement and management infrastructure can include one or more identity management 122, data integration 124, replication (e.g., Oracle Golden-Gate) 126, virtual assembly builder 128, system provisioning 130, tenant management 132, and/or enterprise manager components 134.

As further shown in FIG. 2, in accordance with an embodiment, the shared enablement and management infrastructure can also include other components, such as virus scan 142, secure file transfer 144, HTTP routing 146, whitelist 148, notifications 150, secure backup 152, integration gateway 154, and/or usage & billing 156 components.

The example shown in FIG. 2 is provided as an illustration of some of the types of components which can be included in a cloud computing environment, or within a shared enablement and management infrastructure. In accordance with other embodiments, different and/or other types or arrangements of components can be included.

Java Cloud Services

In accordance with an embodiment, a cloud environment, such as Oracle Public Cloud (OPC), can include a Java cloud services (JCS) infrastructure, which allows a suite of software applications, middleware, and database offerings to be delivered to customers in a self-service, elastically scalable manner.

In accordance with an embodiment, the JCS infrastructure can orchestrate, in combination with other cloud environment components, the creating and/or updating of a platform instance of a Java cloud service (Java service), including provisioning and deployment of the platform instance and/or deployment of software applications, and one or more personality injection or application deployment processing. Additional resources and/or services, such as a database service, can be wired to or otherwise associated with the Java cloud service, for use by customer applications that are deployed to the cloud.

In accordance with an embodiment, the JCS infrastructure enables cloud customers to obtain a dedicated set of application server (e.g., J2EE, or WebLogic) instances, based on a subscription level. In accordance with an embodiment, server instances can run in their own virtual machine (VM) instance, and a virtual assembly builder component (e.g., OVAB) can be used for deployment and teardown of service instances. In accordance with an embodiment, customers can be associated with one or more tenants and/or one or more Java cloud service subscriptions, and instances can be provisioned based on the subscription configuration. Incoming requests can be, e.g., load-balanced to HTTP servers, and routed to appropriate tenants and instances.

Functionally, the JCS infrastructure allows for the self-service provisioning of Java cloud service instances. Once provisioned, a customer's service administrators can interact with the service by, e.g. deploying EAR and WAR files, as they would to a traditional non-cloud application server environment, subject to certain cloud-provider guidelines, such as application whitelist validation.

In accordance with an embodiment, a Java cloud service instance can be a WebLogic Server (WLS) based Java EE application server. In accordance with such embodiments, each tenant receives a dedicated set of WLS server instances that include a WLS administration server and one or a plurality of managed servers based on their subscription level. These servers are run within their own virtual machine (VM) instance, which allows the use of virtual assembly builder components and products, such as Oracle Virtual Assembly Builder assemblies, to be used for the quick and flexible deployment and teardown of service instances. In accordance with an embodiment, tenants also receive their own database schema.

Figure 3:
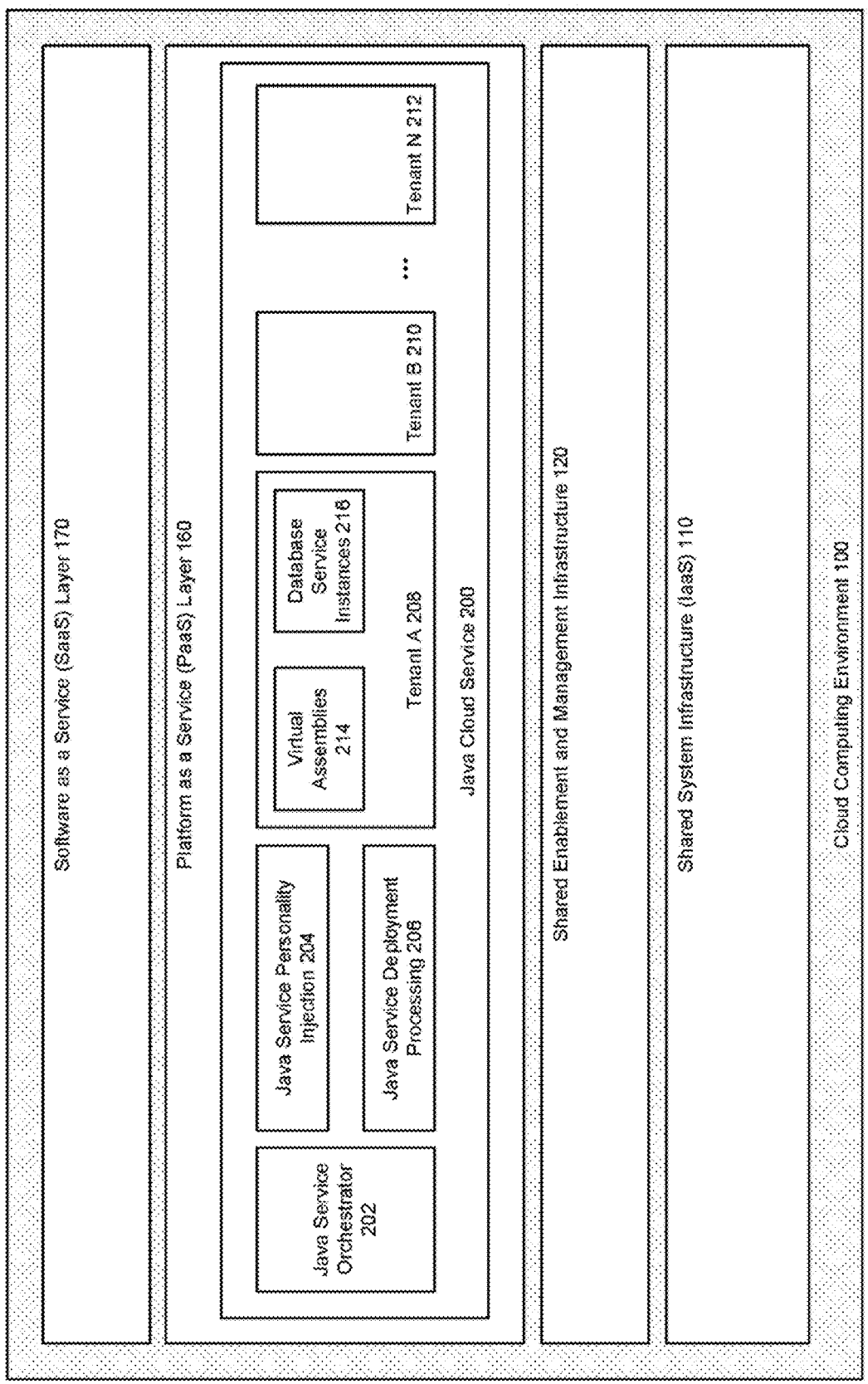
FIG. 3 illustrates an environment that can include a Java cloud service component, in accordance with an embodiment.

FIG. 3 illustrates an environment that can include a Java cloud service component, in accordance with an embodiment. As shown in FIG. 3, in accordance with an embodiment, the Java cloud service component can include a Java service orchestrator 202, and components for performing Java service personality injection 204, Java service deployment processing 206, and creating one or more tenants 208, 210, 212, each with one or more service instances and virtual assemblies 214, and database service instances 216.

In the context of a JCS infrastructure, a Java cloud service can include one or more hosts running, e.g., operating system (OS) and middleware components. Customer/user applications can be developed and deployed into their Java service instance, where they can be run in the cloud similarly to how those applications would run in a traditional non-cloud application server environment. Multiple tenants, each with their own Java service instances, can utilize common, e.g., computer hardware resources, while their Java service environments and their customer applications are securely separated from one another.

In accordance with an embodiment, the use of a JCS infrastructure, and deploying applications to a Java service, also enables customers/users to take advantage of various/ additional cloud environment features, such as centralized Java service patching, which is described in further detail below.

Figure 4:
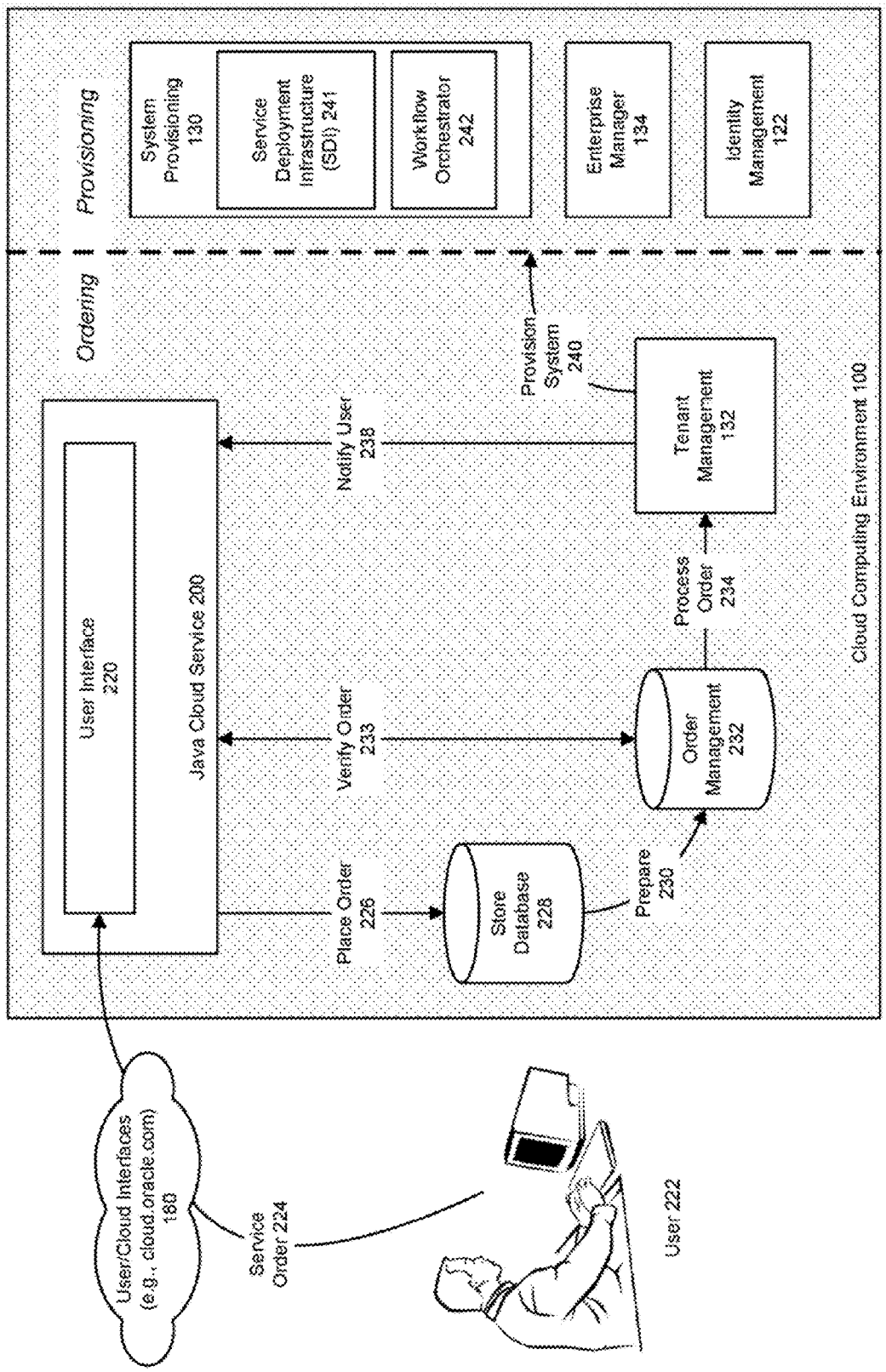
FIG. 4 further illustrates an environment that includes a Java cloud service component, in accordance with an embodiment.

FIG. 4 further illustrates an environment that includes a Java cloud service component, in accordance with an embodiment. As shown in FIG. 4, in accordance with an embodiment, a cloud environment which includes one or more services that can be customized for use with a cloud tenant (such as a Java cloud service 200) can be associated with a user interface 220 that enables a user 222 to either place an order 224 for a new instance of that service, and/or manage an existing service instance.

In accordance with an embodiment, ordering of a new instance of a service can include both ordering and provisioning phases. During the ordering phase, the user can place an order 226, which is initially recorded in a store database 228, where it is prepared 230, and then provided to an order management component 232. After the user has verified the particulars of their order 233, the order can be processed 234 including, in accordance with an embodiment, passing the order to the tenant management component for provisioning 240. At various stages of the order process, the user can be notified as to their current order status 238.

Subsequently, during the provisioning phase, the system can call upon one or more system provisioning components including, in accordance with an embodiment, components such as a service deployment infrastructure (SDI) 241, and a workflow orchestrator 242, to orchestrate the remaining steps of the provisioning process.

For example, in accordance with an embodiment, the JCS infrastructure can interact with shared enablement and management infrastructure components such as a Tenant Automation Solution (TAS) to manage business processes associated with a customer order, and determine whether an order should proceed to provisioning; a System Deployment Infrastructure (SDI) for service instance creation, deletion, and scale up; an IDM infrastructure which associates each tenant with an Identity Domain and unique name space, such that each tenant's Identity Domain is isolated from one other; or a virtual assembly builder component (e.g., OVAB) to support the use of service instance templates, provision empty service instances, and allow personalities to be assignment to service instances.

In accordance with an embodiment the virtual assembly builder component can maintain a repository of virtualization format archives (e.g., OVA) created by a Studio or design-time development component, and can provide options for registering OVAs to virtualized systems such as VM servers, orchestrating the deployment of software defined by the OVA, and providing access to assemblies, e.g., through the use of a deployer interface.

Figure 5:
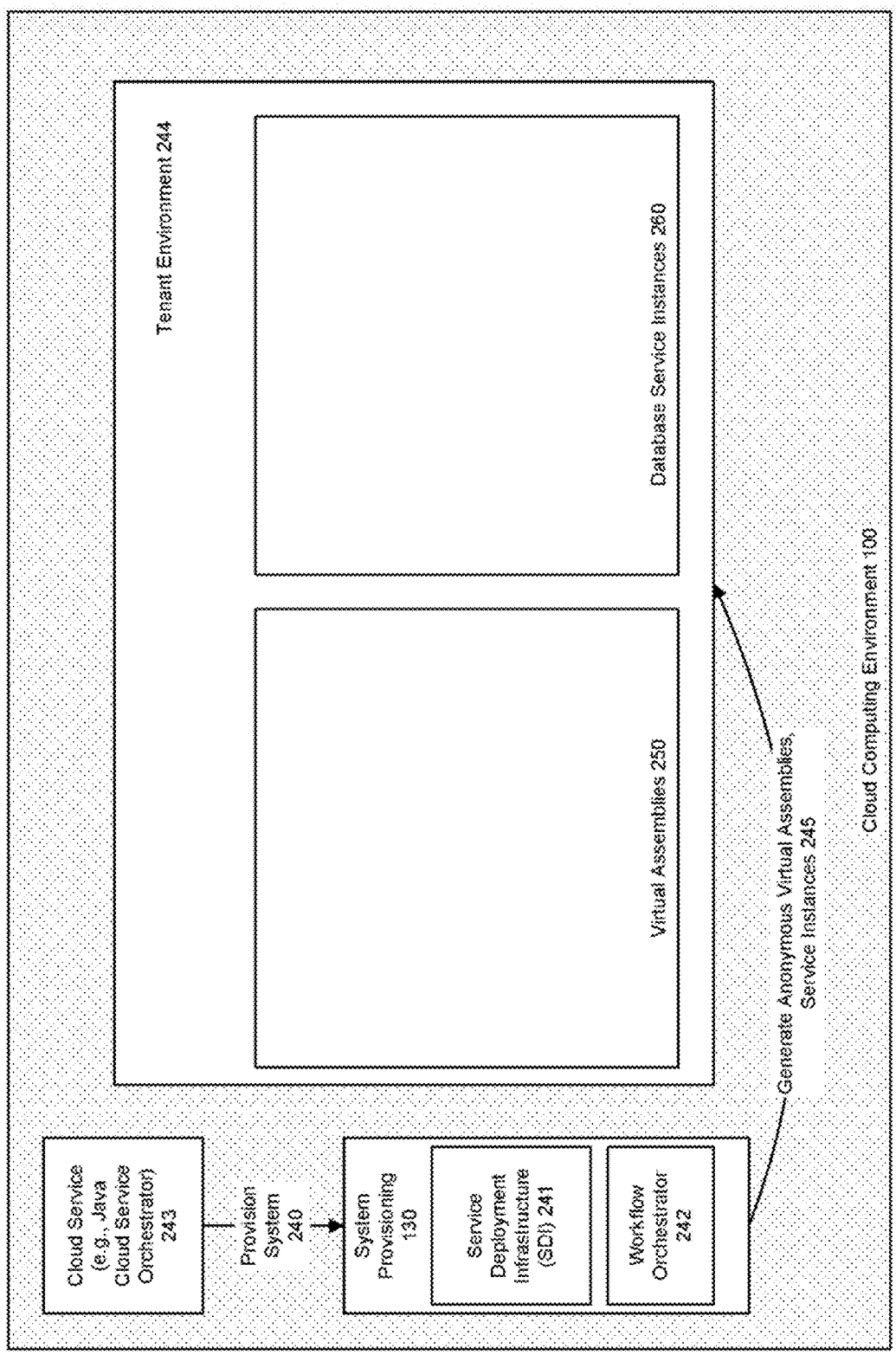
FIG. 5 illustrates how an environment that includes a Java cloud service can use virtual assemblies, in accordance with an embodiment.

FIG. 5 illustrates how an environment that includes a Java cloud service can use virtual assemblies, in accordance with an embodiment. As shown in FIG. 5, a tenant environment is created 244, by generating 245 virtual assemblies 250 and/or service instances 260. Initially, virtual assemblies and service instances will be anonymous. They will receive personalities later in the process.

Figure 6:
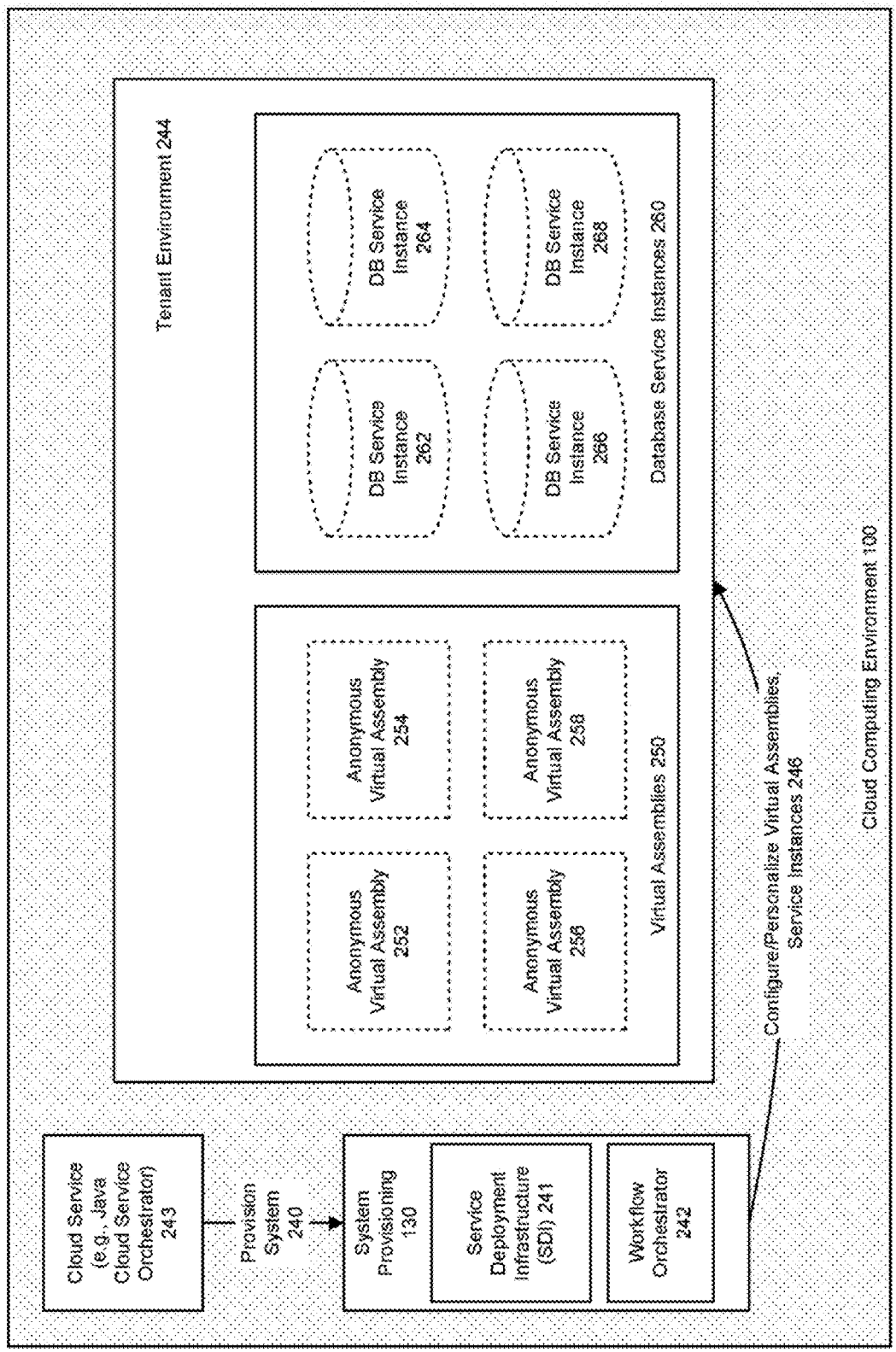
FIG. 6 further illustrates the use of virtual assemblies, in accordance with an embodiment.

FIG. 6 further illustrates the use of virtual assemblies, in accordance with an embodiment. As shown in FIG. 6, the system can create a plurality of anonymous virtual assemblies 252, 254, 256, 258 and service instances (in this example, database service instances 262, 264, 266, 268). In accordance with an embodiment, a tenant receives a dedicated set of application server (e.g. WLS) server instances and one or a plurality of managed servers based on their subscription level, wherein each server runs within its own virtual machine (VM) instance. Each of the assemblies and/or service instances can then be configured 246 to meet the order requirements.

Figure 7:
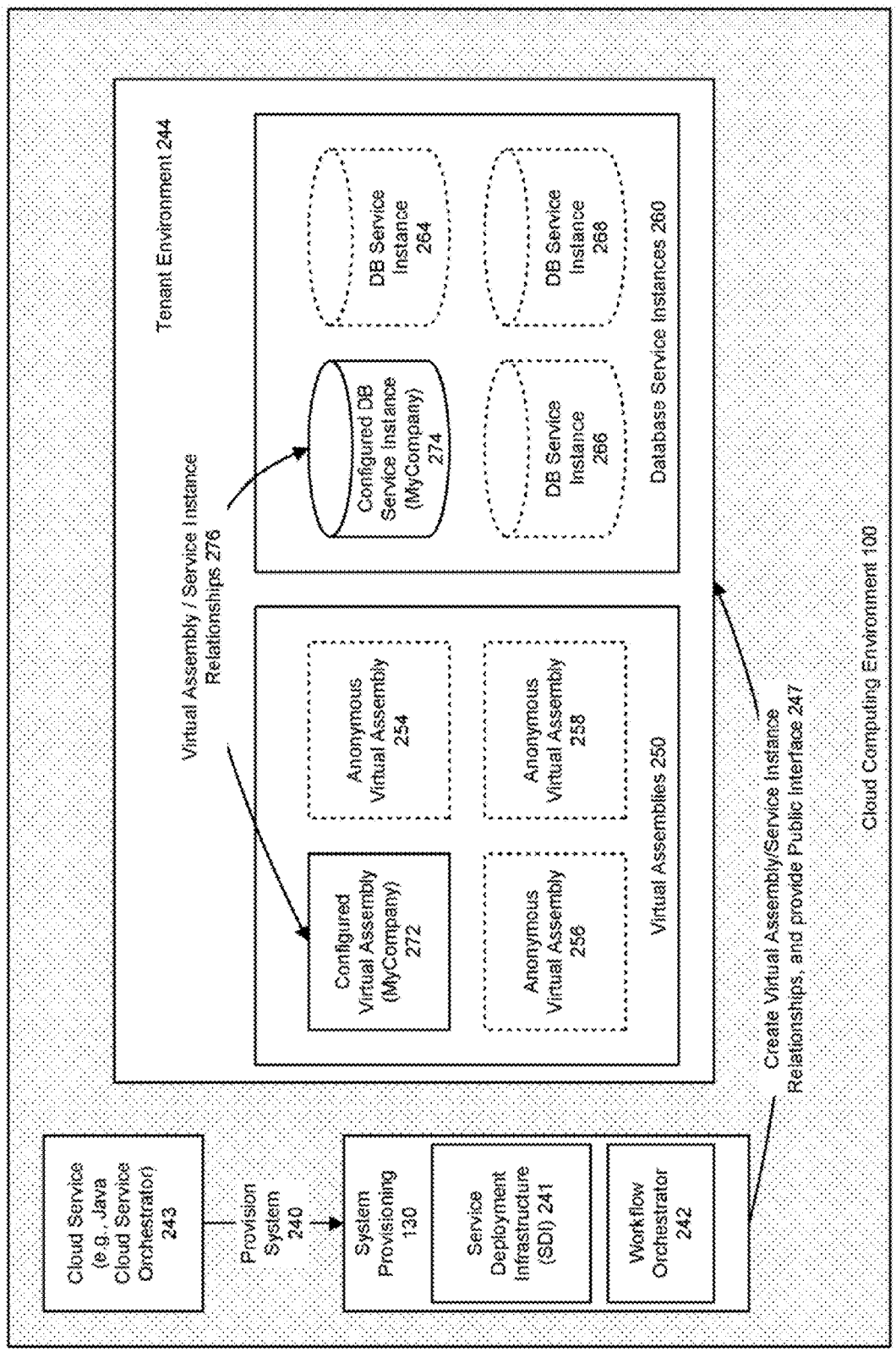
FIG. 7 further illustrates the use of virtual assemblies, in accordance with an embodiment.

FIG. 7 further illustrates the use of virtual assemblies, in accordance with an embodiment. As shown in FIG. 7, a particular virtual assembly 272 and/or particular service instance 274 is configured to suit the order (e.g. MyCompany), and at the same time its public interfaces are created 247. For example, in the context of a Java cloud service, the resultant platform instance will contain all of those resources that are required to provide a WebLogic or other application server service, for a given tenant according to their order, including, e.g., an instance database, administration server, and one or more application servers. Each of the configured virtual assembly can include a relationship 276 to a service instance.

Figure 8:
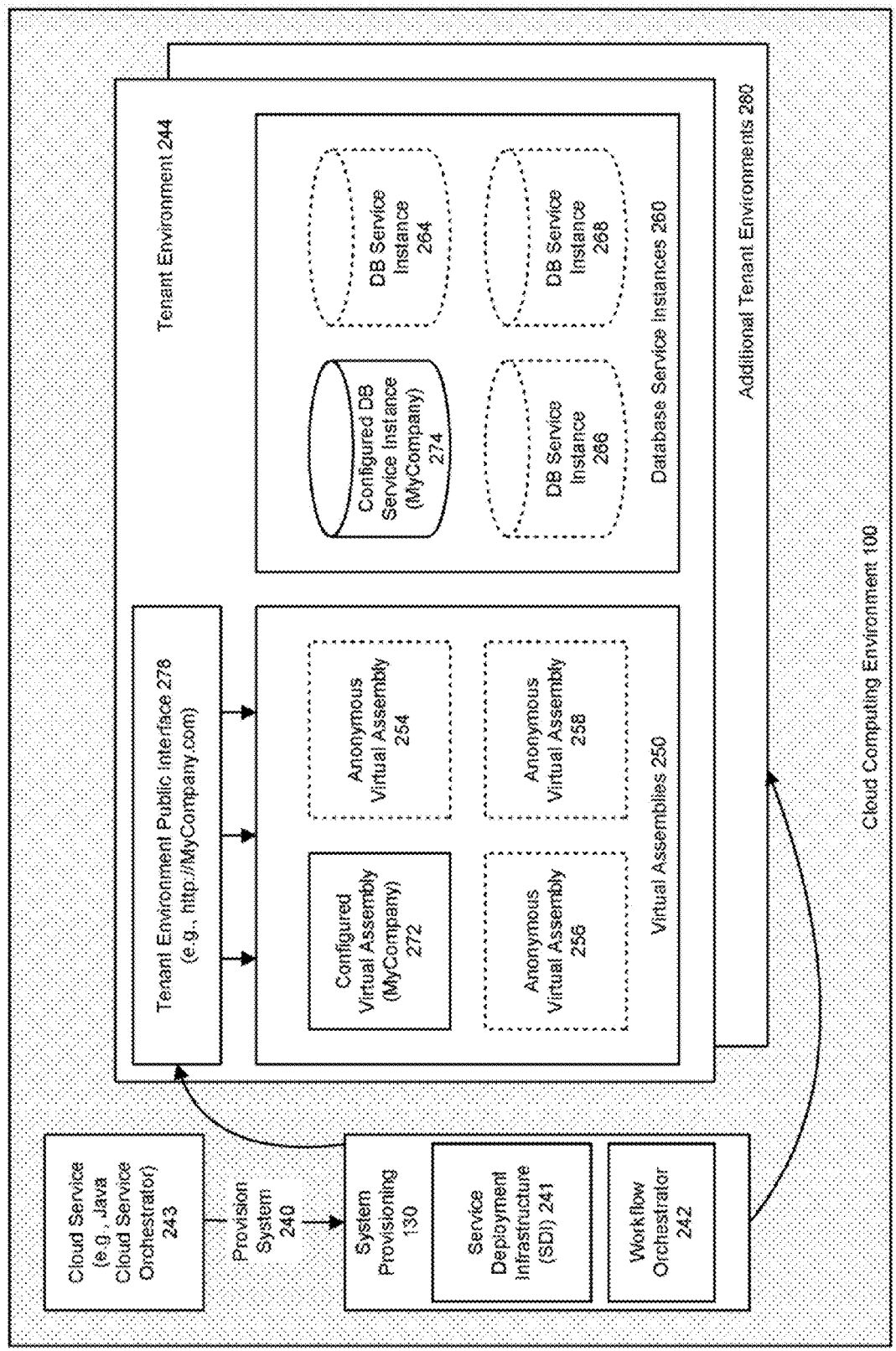
FIG. 8 further illustrates the use of virtual assemblies, in accordance with an embodiment.

FIG. 8 further illustrates the use of virtual assemblies, in accordance with an embodiment. As shown in FIG. 8, a public interface is create 278 for use by the tenant (e.g. http://MyCompany.com). The process can be repeated for other tenants 280. Incoming requests can then be, e.g., load-balanced to HTTP servers, and routed to appropriate tenants and instances.

Figure 9:
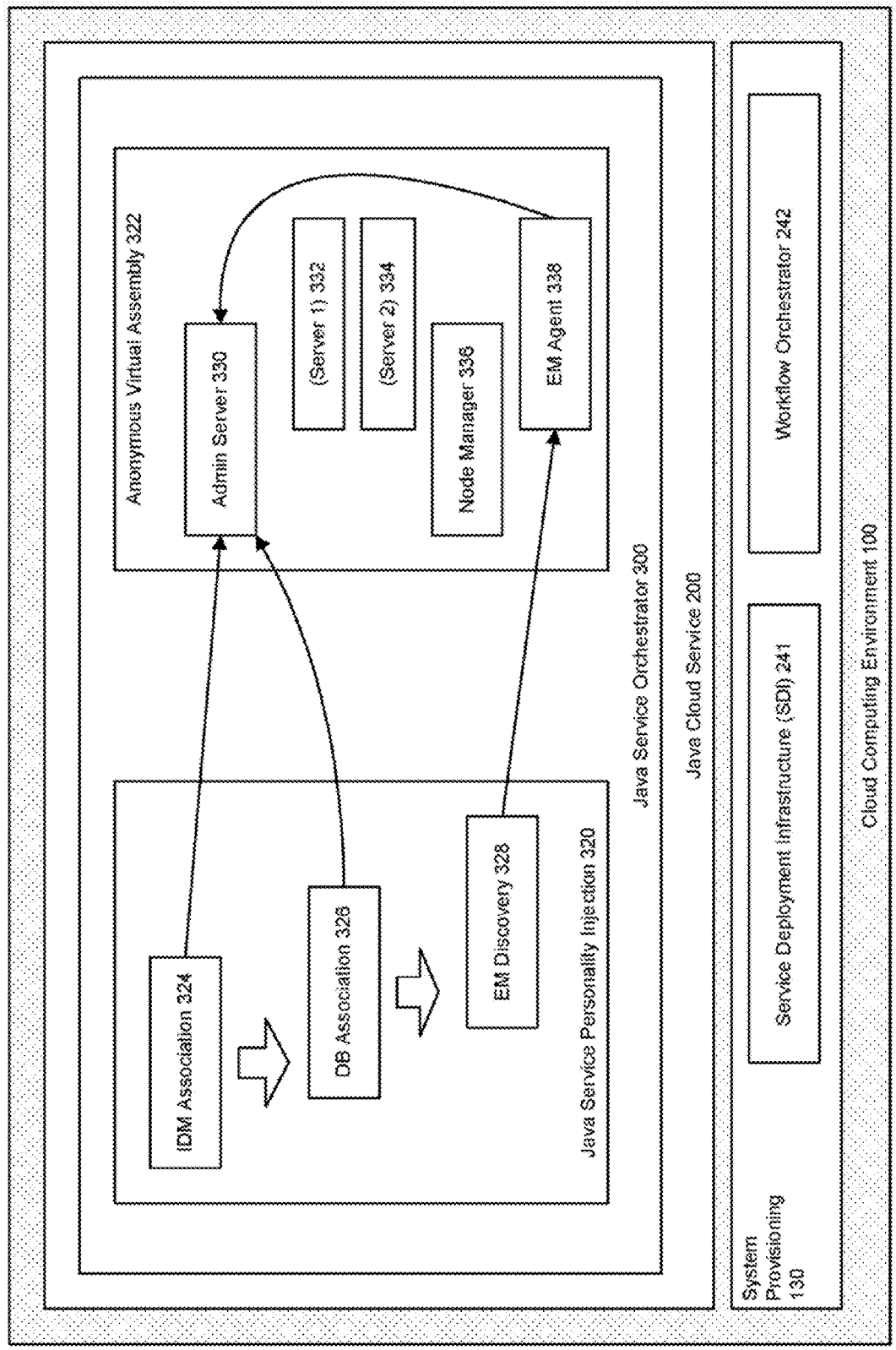
FIG. 9 illustrates Java cloud service personality injection, in accordance with an embodiment.

FIG. 9 illustrates Java cloud service personality injection, in accordance with an embodiment. As described above, in accordance with an embodiment, the features of a workflow orchestrator as described above can be used with any service, including JCS, to allow a Java service to be customized for use with a cloud tenant. In accordance with an embodiment, a cloud environment which includes a service that can be customized for use with a cloud tenant, such as a Java cloud service, can be associated with a user interface that enables a user to place an order for a new instance of that service.

As shown in FIG. 9, in accordance with an embodiment, upon receiving an order, the service (in this example the Java cloud service) can utilize the workflow orchestrator to perform the tasks necessary to instantiate a platform instance for that particular service (i.e., in this example the workflow orchestrator acts as a Java service orchestrator 300).

In the example shown in FIG. 6, in order to create a Java cloud service platform instance, an anonymous assembly 322 is first created, e.g., by requesting that SDI and/or OVAB create an anonymous assembly.

Then, a personality 320 is injected into the anonymous assembly, to configure the assembly for use by the tenant. In accordance with an embodiment, personalization can include, e.g., performing identity management (IDM) association 324, database association 326, and enterprise management discovery 328. Each of these steps can be coordinated by the workflow orchestrator, in combination with additional components or systems as appropriate.

The result of personality injection is one or more personalized assemblies including, depending on the particular order being processed, an administration server 330, one or more (e.g., WebLogic) application server instances 332, 334, a node manager 336, and an enterprise management agent 338.

Figure 10:
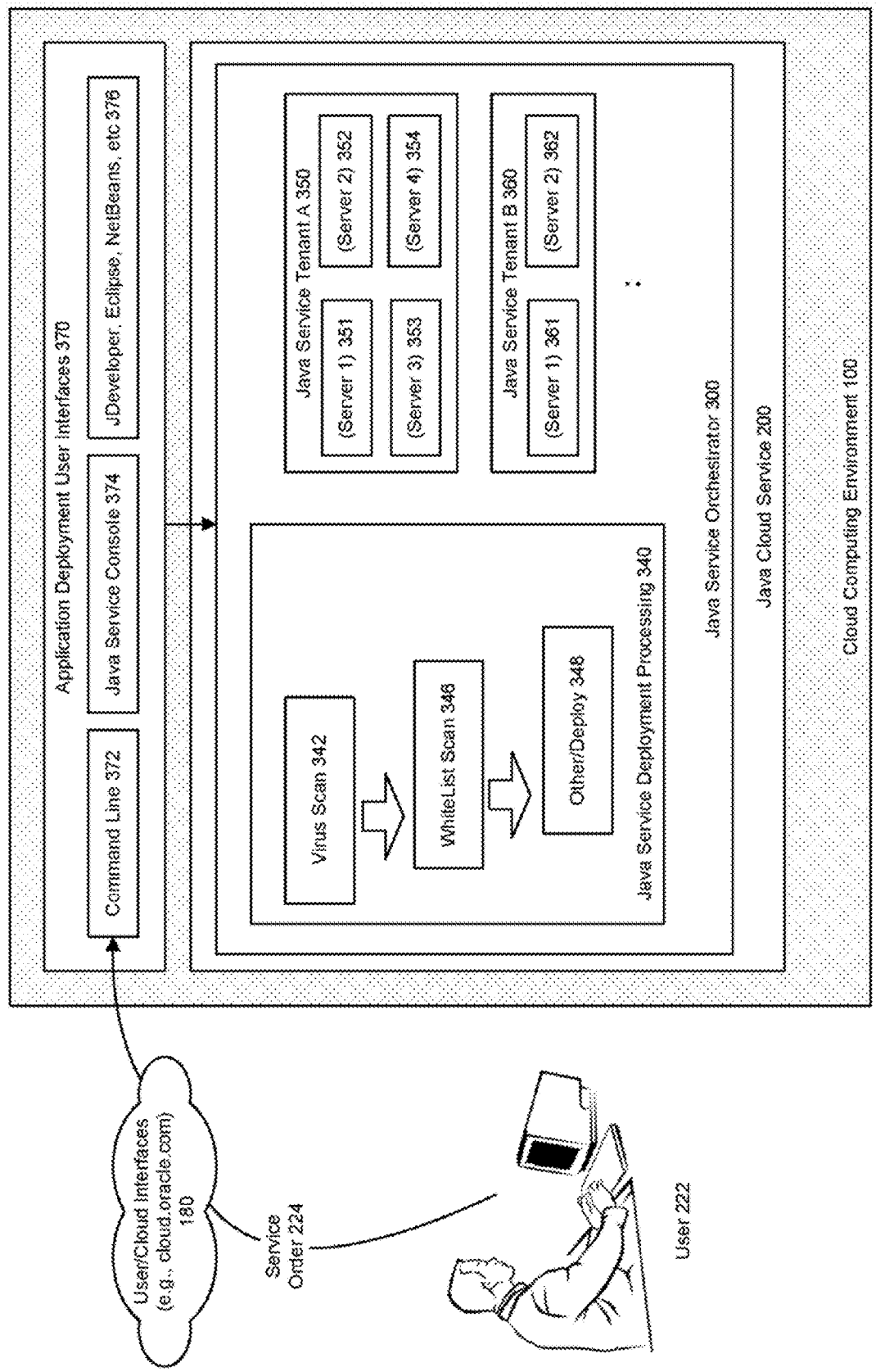
FIG. 10 illustrates Java cloud service deployment processing, in accordance with an embodiment.

FIG. 10 illustrates Java cloud service deployment processing, in accordance with an embodiment. As shown in FIG. 10, in accordance with an embodiment, deployment of a Java cloud service can include additional procedures or functions, such as scanning for viruses 342, or performing whitelist scanning 346, or other deployment-related functions 348. Each of these steps can again be coordinated by the workflow orchestrator, in combination with additional components or systems as appropriate.

As a result of deployment, one or more Java cloud service tenants 350, 360 can be deployed, including one or more server instances (in this example, Tenant A has four application server instances 351, 352, 353, 354; while Tenant B has two application server instances 361, 362), each of which have been personalized and, e.g., scanned for viruses and whitelist conformation, or otherwise prepared according to the particular configuration of the platform instance.

In accordance with an embodiment, the system can also include one or more application deployment user interfaces 370, such as a command line interface 372, Java service console 374, JDeveloper 376, or other interfaces that allow the user to deploy their applications to, in this example a Java cloud service tenant.

In accordance with an embodiment, the above steps can be performed in combination with a workflow orchestrator which can be used to orchestrate operations between the cloud environment and the PaaS environment, e.g., by receiving a request from a tenant automation system, and coordinating the provisioning and deployment of virtual assemblies or applications, including use of the shared enablement and management infrastructure.

In accordance with an embodiment, the workflow orchestrator can perform additional procedures or functions during its orchestration of the provisioning or deployment, e.g., scanning an application for viruses, or comparing the application being deployed against a whitelist of acceptable API calls. The workflow orchestrator can also enable creation and management of platform instances, each of which can include one or more application server (e.g., WebLogic server) instances, together with other resources that are useful for running applications (e.g., a database service), and which can be run on shared hardware resources.

Each workflow orchestrator job is a sequence of actions specific to a particular PaaS workflow, e.g., the provisioning of a Java cloud service platform instance. Actions are typically performed in a sequential order, with failure in any step resulting in failure of the overall job. Depending on the service platform configuration, some workflow actions may delegate actions to external systems relevant to the workflow, such as an enterprise manager, or a service deployment infrastructure.

Figure 11:
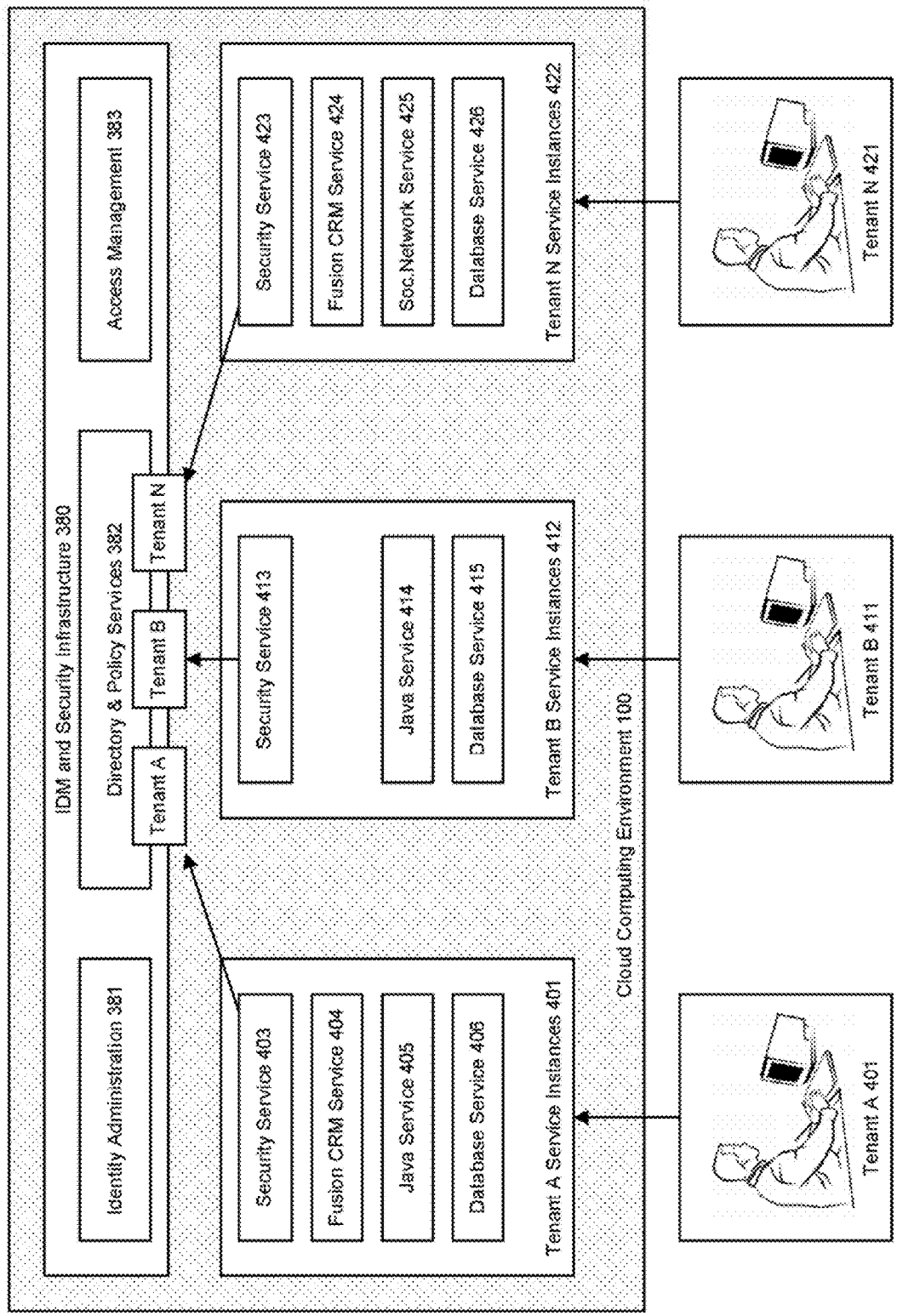
FIG. 11 illustrates support for multiple tenants in an environment that includes a Java cloud service, in accordance with an embodiment.

FIG. 11 illustrates support for multiple tenants in an environment that includes a Java cloud service, in accordance with an embodiment. In accordance with an embodiment, an identity domain provides a persistent namespace for use with a tenant's security artifacts. Each identity domain represents a "slice" of the shared identity domain system, provisioned for a particular tenant. As shown in FIG. 11, in accordance with an embodiment, an IDM and security infrastructure 380, together with identity administration 381, director and policy service 382, and access management 383, can be used to support multiple tenants 401, 411, 421, each with different service requirements 401, 412, 422. For example as shown in FIG. 11, tenant A's service instances can include a security service 403, Fusion CRM service 404, Java service 405, and database service 406. Tenant's B service instances can include a security service 413, Java service 414, and database service 415. Tenant C's service instances can include a security service 423, Fusion CRM service 424, Social Network service 425, and database service 426.

Figure 12:
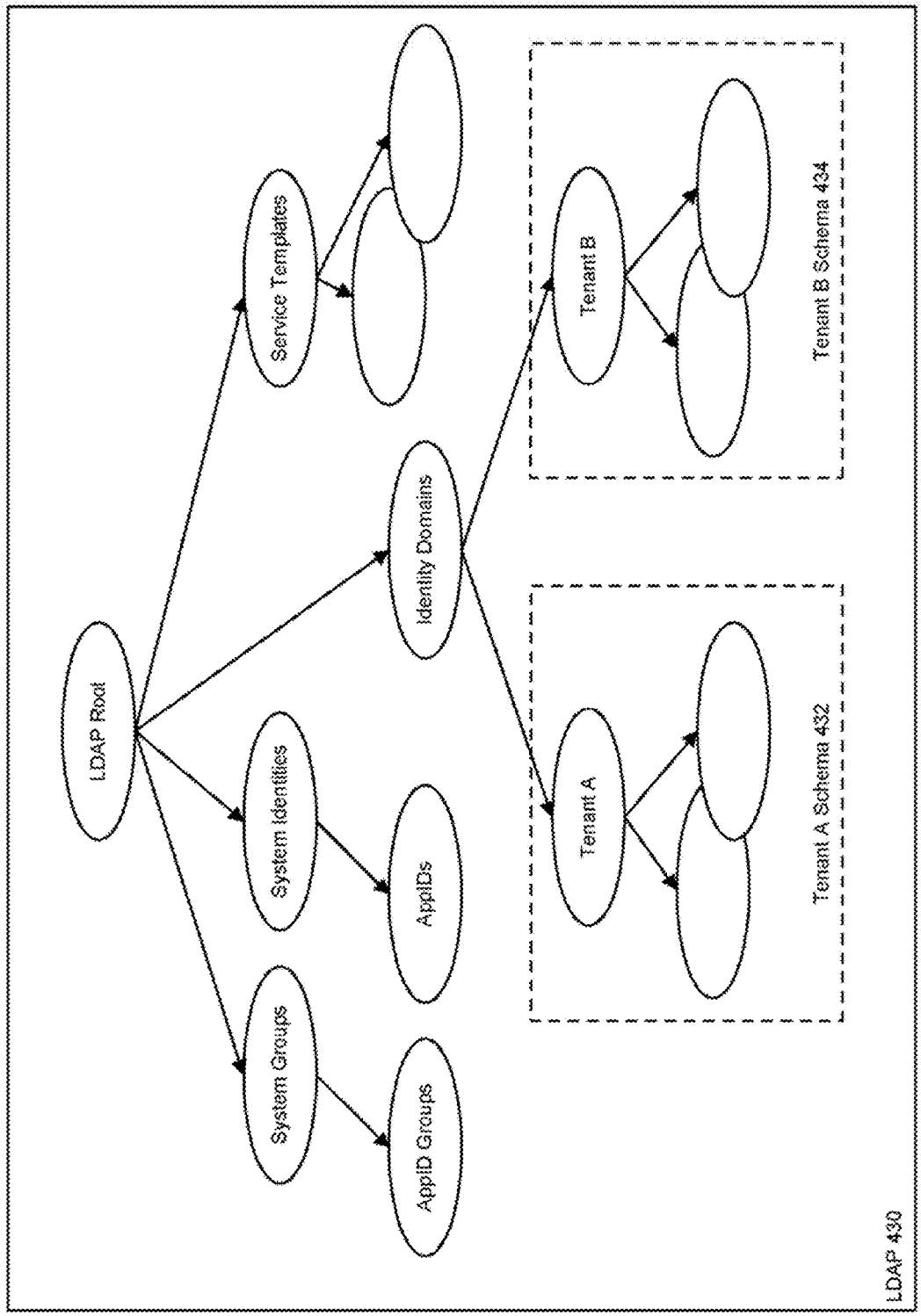
FIG. 12 illustrates the use of LDAP to support multiple tenants, in accordance with an embodiment.

FIG. 12 illustrates the use of LDAP to support multiple tenants, in accordance with an embodiment. As shown in FIG. 12, a shared LDAP 430 can be used to allow a tenant A's schema 432, to coexist with a tenant B's schema 434. As described above, each tenant obtains a separate slice of the shared identity management system, with each particular tenant having a view into its own slice, as determined by its schema. This enables several tenants to be securely hosted within the cloud environment, on a system using a common underlying infrastructure, while separated from other tenant environments and applications.

Figure 13:
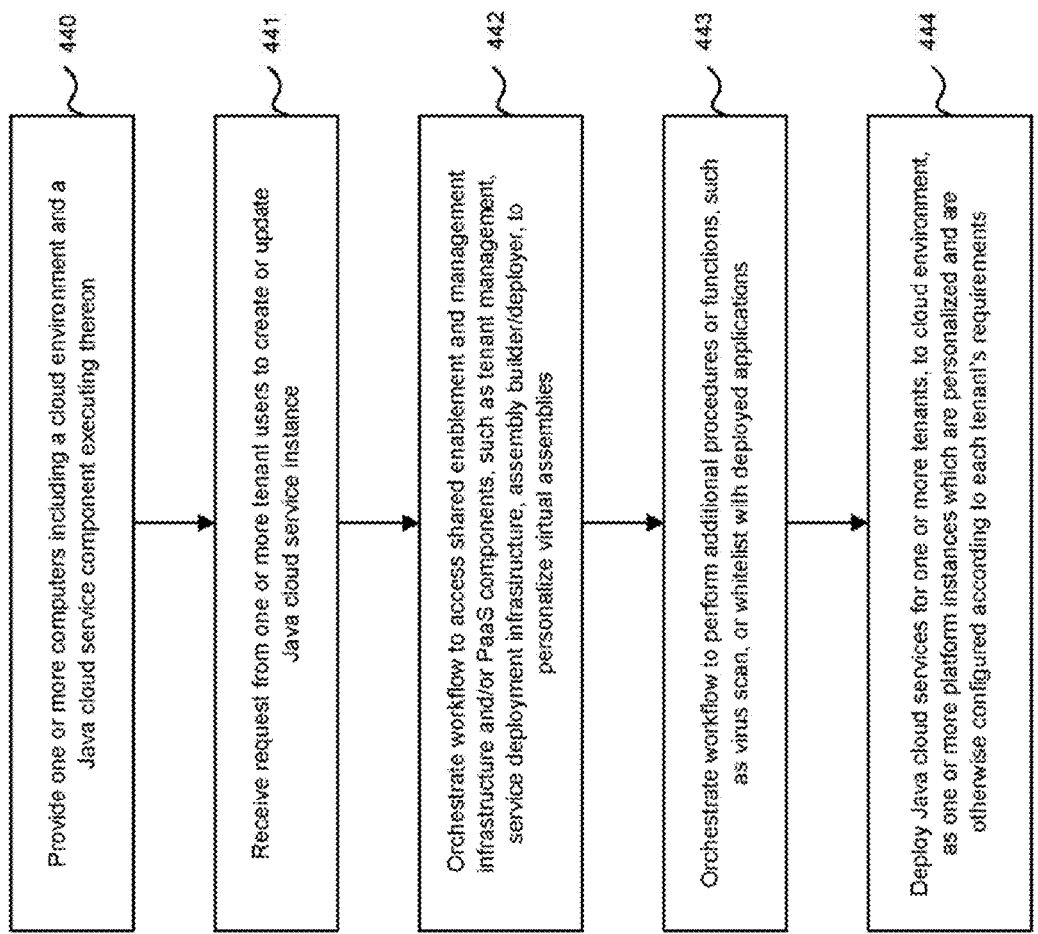
FIG. 13 is a flowchart of a process for use with an environment that includes a Java cloud service component, in accordance with an embodiment.

FIG. 13 is a flowchart of a process for use with an environment that includes a Java cloud service component, in accordance with an embodiment. As shown in FIG. 13, at step 440, one or more computers are provided, including a cloud environment and a Java cloud service component executing thereon.

At step 441, the system receives a request from one or more tenant users to create or update a Java cloud service instance.

At step 442, the Java cloud service orchestrator and/or additional components orchestrates a workflow to access shared enablement and management infrastructure and/or PaaS components, such as tenant management, service deployment infrastructure, assembly builder/deployer, to personalize virtual assemblies.

At step 443, the workflow is orchestrated to perform additional procedures functions, such as virus scan, or whitelist with deployed applications.

At step 444, the Java cloud services for one or more tenants is deployed to the cloud environment, as one or more platform instances which are personalized and are otherwise configured according to each tenant's requirements.

Although the above description describes how JCS infrastructure can be used in combination with other components, such as TAS, SDI, and OVAB, to create Java service platform instances; in accordance with other embodiments, the JCS infrastructure can be similarly used with other service components within the cloud environment, or with other types of shared enablement and managing infrastructure, to create Java service, or other platform instances.

Whitelist Functionality

In accordance with an embodiment, software applications being deployed to the cloud are restricted from using certain classes or application program interfaces (APIs). During provisioning by, e.g., a Java cloud services (JCS) infrastructure, or another component of the cloud environment, an application's resources, such as its classes or API calls, can be matched against a whitelist of acceptable resources. If the application fails to be validated against the whitelist, it will not be deployed to the cloud, and the customer/user notified accordingly.

In accordance with an embodiment, a whitelist functionality can be packaged within a software development kit (SDK), which customers/users can use during development of their applications, to verify that the applications will comply with, or successfully validate against the whitelist, prior to attempting to deploy the applications to the cloud.

Figure 14:
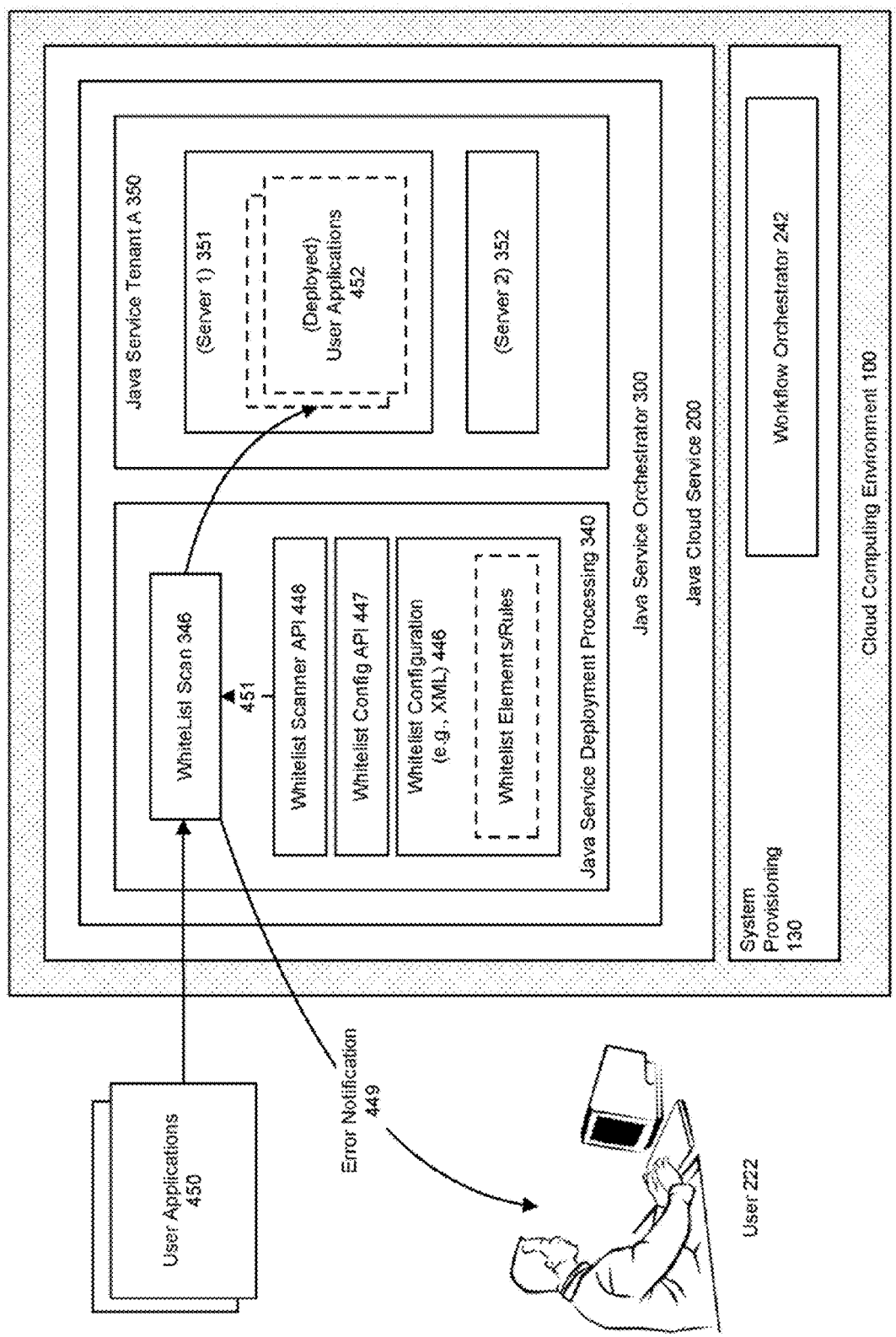
FIG. 14 illustrates how an environment including a Java cloud service can include whitelist functionality, in accordance with an embodiment.

FIG. 14 illustrates how an environment including a Java cloud service can include whitelist functionality, in accordance with an embodiment. As shown in FIG. 14, the whitelist scan component 346 can use information provided by a whitelist configuration (e.g., as an XML-based configuration file) 446, which specifies as configuration elements those classes, APIs, or other functions or resources which are considered acceptable or valid for use within the cloud environment.

For example, a JCS infrastructure can be associated with configuration elements that indicate the classes, APIs, or other functions or resources which are considered acceptable or valid for use with a Java cloud service platform instance. Other service components within the cloud environment may have their own/different list of acceptable classes, APIs, or other functions or resources.

In accordance with an embodiment, the whitelist scan component can include a whitelist configuration API 447, which allows modification and use of the whitelist configuration; and a whitelist scanner API 448, which can be used to parse an application's classes, APIs, or other functions or resources during provisioning and/or deployment of the application to the cloud environment.

In accordance with an embodiment, the whitelist configuration (e.g., the contents of the XML file) is not intended to directly modifiable by consumers of the whitelist, such as Oracle development environments (IDEs), or external users. Instead, in accordance with an embodiment, the whitelist configuration API can be extended as an extensible set of Java APIs that provide access to certain portions of the configuration file. This allows different IDEs to integrate the configuration API according to their particular requirements, e.g., to flag an error on any "not allowed" API usages in a Java application source which the user might be editing within the IDE.

In accordance with an embodiment, the scanner API can be provided as an extension of the configuration API, and include its own provider implementation. This enables the scanner API to be directly used by the whitelist scan component, and/or by other components within the cloud environment shared enablement and management infrastructure, such as by a workflow orchestrator, during deployment or redeployment of an application.

In accordance with an embodiment, the whitelist scan component can be provided as a Java ".jar" file, which receives whitelist element information 451 from the whitelist configuration. The whitelist validation of an application can be automatically enforced whenever the user performs a remote cloud deployment. By default, whitelist validation is not performed for local application deployments; however, in accordance with an embodiment, users can validate their application for local deployment by adding the whitelist.jar into the classpath argument of the install or reinstall commands for their particular system.

As further shown in FIG. 14, when a user application 450 is subsequently deployed to the cloud environment, e.g., to the Java cloud service, the application's classes, APIs, or other functions or resources are validated by the whitelist scan component, before being deployed 452. In the event of an error or warning (e.g., that the application cannot be deployed because it fails the whitelist validation), an appropriate notification can be returned 449 to the user.

Figure 15:
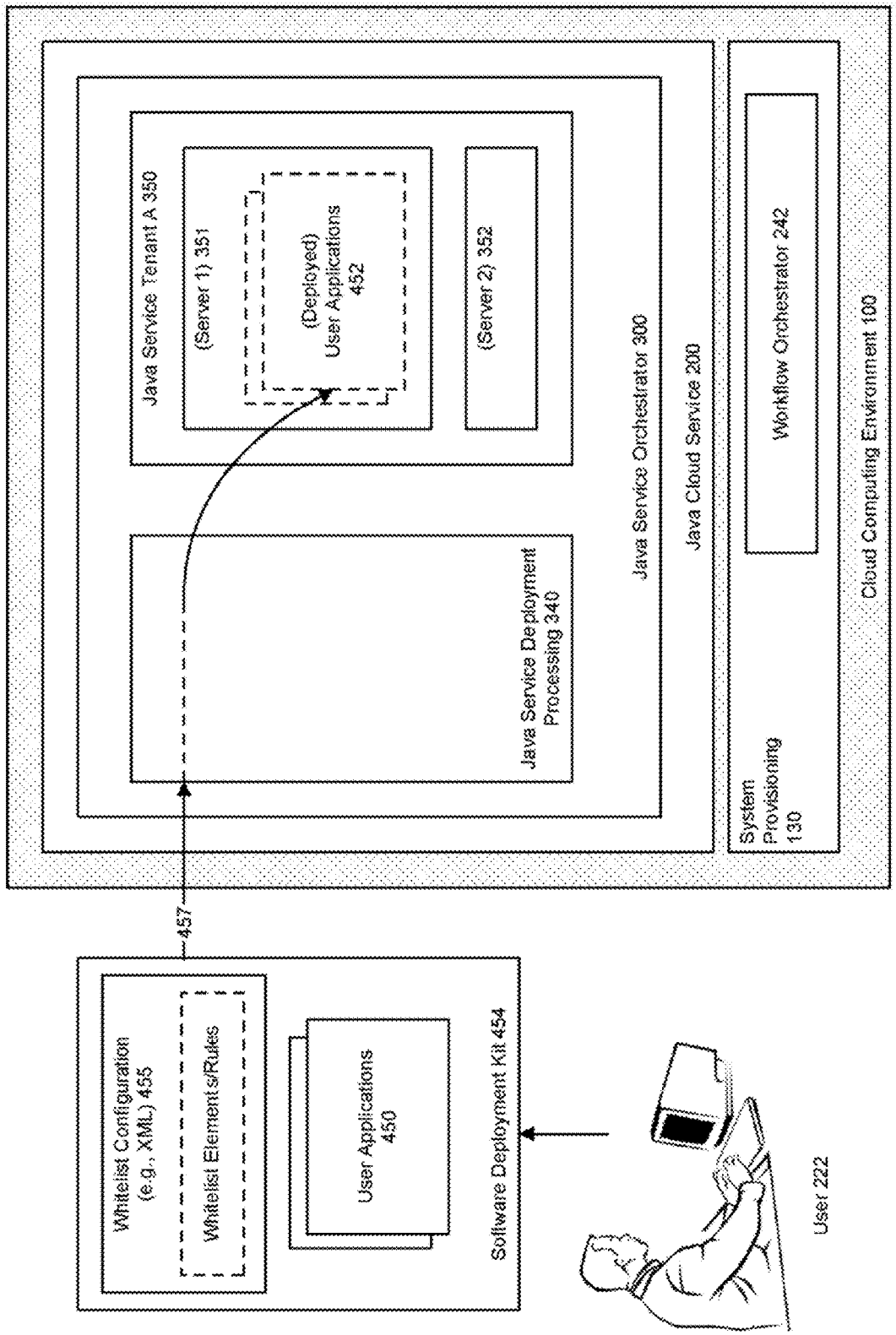
FIG. 15 illustrates use of a whitelist with a software development kit, in accordance with an embodiment.

FIG. 15 illustrates use of a whitelist with a software development kit, in accordance with an embodiment, which allows development customers/users to verify that the applications will comply with, or successfully validate against the whitelist, prior to attempting to deploy the applications to the cloud.

As shown in FIG. 15, in accordance with an embodiment, the SDK 454 can itself include a whitelist configuration 455. During development of an application, the user can similarly check their application's classes, APIs, or other functions or resources against the whitelist provided by the SDK, to ensure that those application resources meet the requirements of the cloud environment (e.g., in the context of JCS, those requirements that pertain to Java cloud services), prior to communicating the application 457 to the cloud for deployment.

In accordance with an embodiment, the whitelist scan component can use a whitelist configuration that is expressed in an XML document as several sections or configuration elements for different types of classes, APIs, or other application functions or resources, for example:

Scansets element: In accordance with an embodiment, this configuration section or element contains a list of scanset elements that are used to describe which kinds of class files should be scanned against. For example, this configuration section or element can be used to allow certain frequently used JAVA APIs to be exempted from being scanned (against apisets).

Apisets element: In accordance with an embodiment, this configuration section or element contains a list of apiset elements that are used to describe whether a Java class, method or a field is allowed, or not allowed.

Xmlsets element: In accordance with an embodiment, this configuration section or element contains a list of xmlset elements that are used to describe whether an XML document available in a predefined location of the user archive can contain an XML element, element value, attribute or attribute value.

Fileset element: In accordance with an embodiment, this configuration section or element contains configuration that describes whether a file can be packaged in an archive.

The above examples of whitelist configuration sections or elements are provided by way of example. In accordance with other embodiments, different and/or other types or configuration elements can be included.

In accordance with an embodiment, each configuration element defined within the whitelist configuration (e.g., within an XML section) can also be associated with an indication of its severity, which indicates how severe a violation of that configuration element should be considered. For example, ERRORs may be considered violations that cause the application validation to fail; while WARNINGs may be printed as warnings, but will not cause the overall validation to fail. For example the whitelist configuration element:

```
<xmlelement severity="WARNING" xpath="/*:weblogic-web-
app/*:session-descriptor">
    <include-must>*:cookie-path</include-must>
</xmlelement>
``` provides a warning for an application if a cookie-path is not present in the application's weblogic.xml configuration. In accordance with an embodiment, custom messages can also be specified, so that the user receives additional information as to why something is not allowed. For example:

```
<methods>
    <classname>java.sql.Driver</classname>
    <exclude messageId="NLS_DIRECT_SQL_CONNECTION">
    <methodname>connect</methodname>
    </exclude>
</methods>
```

In the above example, the message id NLS_DIRECT_SQL_CONNECTION is defined by a message bundle, which allows a localized message to be returned as part of the violation. Users also can specify the message directly within the whitelist configuration element, for example:

```
<apiset name="java.rmi.**" messageId="Java remoting not allowed.">
    <exclude>java.rmi.**</exclude>
</apiset>
```

In accordance with an embodiment, the <scansets/> configuration element can be used to excludes libraries that come from trusted third party jars. A class that is not excluded by the <scansets/> and not referenced by any of the class excluded in the </scansets/> is considered to be the class from the user. For example, in accordance with an embodiment, the following sets of features are not supported in the cloud environment, and are excluded from being used by the user code directly: Java non-blocking 10; Java Networking; Executing a new Process; Direct SQL connection; Java Media; Java Compiler; Java RMI; JNI; Java activation; Java desktop accessibility; Oracle Security API; JDK log management; Corba AP; Overriding Security Manager; Remote EJB; JMS; Remote Management. The foregoing features are provided by way of example; in accordance with other embodiments, different and/or other sets of features can be included/excluded.

In accordance with an embodiment, the apiset configuration element can be used to check if a Java class usage is allowed or not. Each apiset has name that is expressed using wildcards. An apiset is bound by its name (i.e., it can not describe configuration outside its bounds); and can either have a list of <include/> elements or a list of <exclude/> elements. A set can not have include and exclude elements. For example:

```
<apiset name="java.awt.*">
    <include>java.awt.Color</include>
    <include>java.awt.AWTKeyStroke</include>
</apiset>
```

In accordance with an embodiment, whitelist validation rules can be used, and the order of the configuration elements, e.g., apiset, can be taken into account when determining whitelist conformation or validity.

For example, while checking if a class (b.ClassInQuestion) is allowed or not, the include/exclude configurations expressed in the first apiset whose name matches with class(b.ClassInQuestion) name being checked, can be used. If no apiset matches with the class(b.ClassInQuestion) usage being checked, then the class usage is simply allowed.

By way of example, in accordance with an embodiment, when the first apiset matches, the semantics of include, exclude elements are as follows:

If there is no include or exclude element, then the whole set is excluded (i.e., any class whose name matches with the name of the apiset is excluded and is not allowed to be used.

If there are include elements and (exclude elements, if any will be ignored), then
   If the class name matches with any of the include elements then the class usage is allowed,
   If the class name does not match with any of the include elements, then the class usage is not allowed.

If there are only exclude elements, then
   If the class name matches with any of the exclude element then the class usage is not allowed,
   If the class name does not match with any of the exclude elements, then the class usage is allowed.

The above example of whitelist validation rules is provided by way of example. In accordance with other embodiments, different and/or other types of rules can be included.

In accordance with an embodiment, a methods configuration element applies only when the class is allowed. If the class itself is not allowed, then all of the methods are also blocked.

This configuration element can be used to check if a Java method usage or a constructor usage is allowed. In accordance with an embodiment, there can be more than one <methods/> element; each <methods/> element is used to describe configuration for methods in a class; and each <methods/> must have (1)<classname/> sub element that has the name of the class, (2) a set of either include elements or exclude elements, for example:

```
<methods>
    <classname>java.lang.Runtime</classname>
        <exclude><methodname>exec</methodname></exclude>
        <exclude>
            <methodname>load*</methodname>
        </exclude>
</methods>
```

By way of illustration, in accordance with an embodiment, the following rules can be applied to determine if a method usage is allowed. (The following example assumes that the system is testing to determine whether the usage of the method CLASS.METHOD(ARGTYPE . . . ) is allowed).

A list of <methods/> elements are scanned to find out the first <methods/> element whose classname matches with "CLASS". If there is none found, the method usage is simply allowed.

General include/exclude policies are applied for matching the method name. Several attributes control the matching and they are given below.

methods/(exclude or include)@constructor—a boolean valued attribute that states if the description is for a constructor. The method name is ignored for constructors. Constructor usages are always checked against constructor configurations. Java method usages are checked against method configuration (for which constructor="false" and there is a method name). The default value is false; for a non-constructor method the method name must match. The method name can have wildcards (say set*).

methods/(exclude or include)@allOverloads—a boolean valued attribute that states if the elements is applicable for all overloaded methods. This means the argument types are ignored. The default value is true; in such a case the configuration does not need to describe the arguments.

methods/(exclude or include)/@argsMathcPolicy—a enum valued attribute that can take one of the following values: EXACT—The list of arguments (ARGTYPE . . . ) in the method being checked must match with the exact list of "methods/(exclude or include)/arg" elements by the size and the order; this is the default value; or PARTIAL—The list can just match with order. The count does not matter as long as all the available args match. There can be lesser number of "methods/(exclude or include)/arg" elements in the xml configuration, but all the types must match with arguments of the method being checked.

methods/include@checkArgs—a boolean valued attribute that states if it is necessary to check that the method arguments are allowed as well. The default value is true, i.e. to allow a method, all of its arguments must be allowed as well. There can be occasions where the user may be calling a method by passing the returned value of another allowed method.

The above example of whitelist validation rules is similarly provided by way of example. In accordance with other embodiments, different and/or other types of rules can be included.

In accordance with an embodiment, a fields configuration element can be provided similarly to methods; the include/exclude will contain the name of the field and it does not support any attribute values used to make the match.

In accordance with an embodiment, an xmlsets configuration element can contain descriptions applicable against an XML file located at the specified location in the input archive. The location in the configuration must match the resource path of the XML file in the containing archive (e.g., the WEB-INF/web.xml for a web.xml in a war).

In accordance with an embodiment, an xmlset configuration element can contain descriptions for XML file as to which elements, element value, attribute or attribute value it can contain. For example, a xmlset/xmlelment contains a list of allowed or disallowed elements to state what element is allowed; which can mandate an element using <include-must/>. An xmlset/xmlelementvalue contains a list of allowed or disallowed values for an xml element. An xmlset/xmlattribute contains a list of allowed or disallowed attributes that an element can contain; which can mandate an attribute using <include-must/>. An xmlset/xmlattribute-value contains a list of allowed or disallowed attribute values that an attribute in an element can have.

In accordance with an embodiment, a filesets configuration element contains descriptions to state if a file can be packaged in the archive, e.g. that a file with extension .exe is not allowed to be packaged.

Each of the above configuration elements and their descriptions are provided by way of example. In accordance with other embodiments, different and/or other types of configuration elements and their descriptions can be included.

Figure 16:
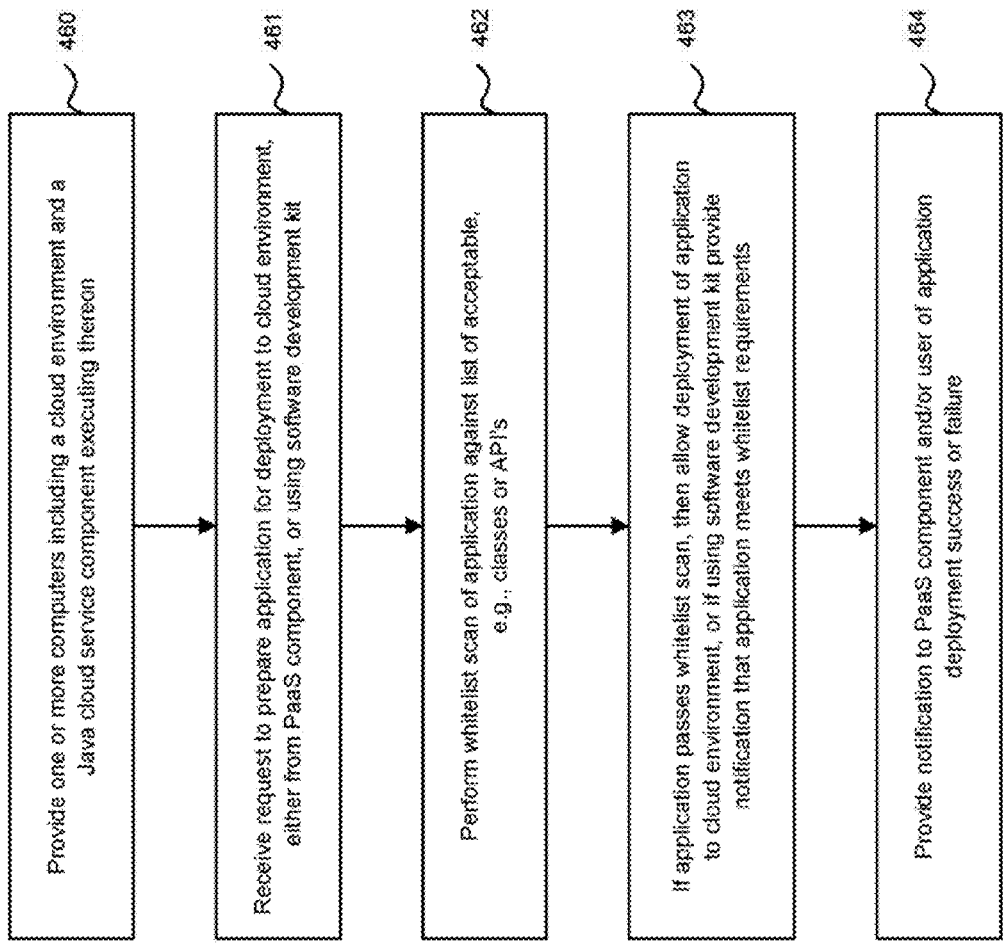
FIG. 16 is a flowchart of a process for using whitelist functionality, in accordance with an embodiment.

FIG. 16 is a flowchart of a process for using whitelist functionality, in accordance with an embodiment. As shown in FIG. 16, at step 460, one or more computers are provided, including a cloud environment and a Java cloud service component executing thereon.

At step 461, a request is received to prepare application for deployment to cloud environment, either from PaaS component or using a software development kit.

At step 462, the system performs whitelist scan of an application's classes, APIs, or other functions or resources, against a list of acceptable, e.g. classes or APIs.

At step 463, if the application passes the whitelist scan, then the system allows deployment of the application to the cloud environment, or, if using a software development kit, indicates the application meets the whitelist requirements.

At step 464, a notification is provided to the pertinent PaaS component and/or the user of application deployment success or failure.

Although the above description describes the use of whitelist validation in the context of a JCS infrastructure, to validate classes, APIs, or other functions or resources which are considered acceptable or valid for use with a Java cloud service platform instance, in accordance with other embodiments, whitelist validation can be similarly used with other service components within the cloud environment which have their own/different list of acceptable classes, APIs, or other functions or resources.

Patching of Java Cloud Services

Within a cloud environment, over a period of time, it may become necessary to patch or otherwise update one or more of the deployed services. For example, in the context of a Java cloud services (JCS) infrastructure, it may become necessary to patch Java service platform instances, or component thereof, such as operating system or middleware components.

In accordance with an embodiment, services can be patched or otherwise updated using a two phase approach. During an offline phase, patches are used to update shared components, such as middleware volumes, without disrupting any currently running Java services. Subsequently, during an online phase, patched components are enabled on all, e.g. Java service hosts, and any necessary domain update/upgrade operations are invoked.

Figure 17:
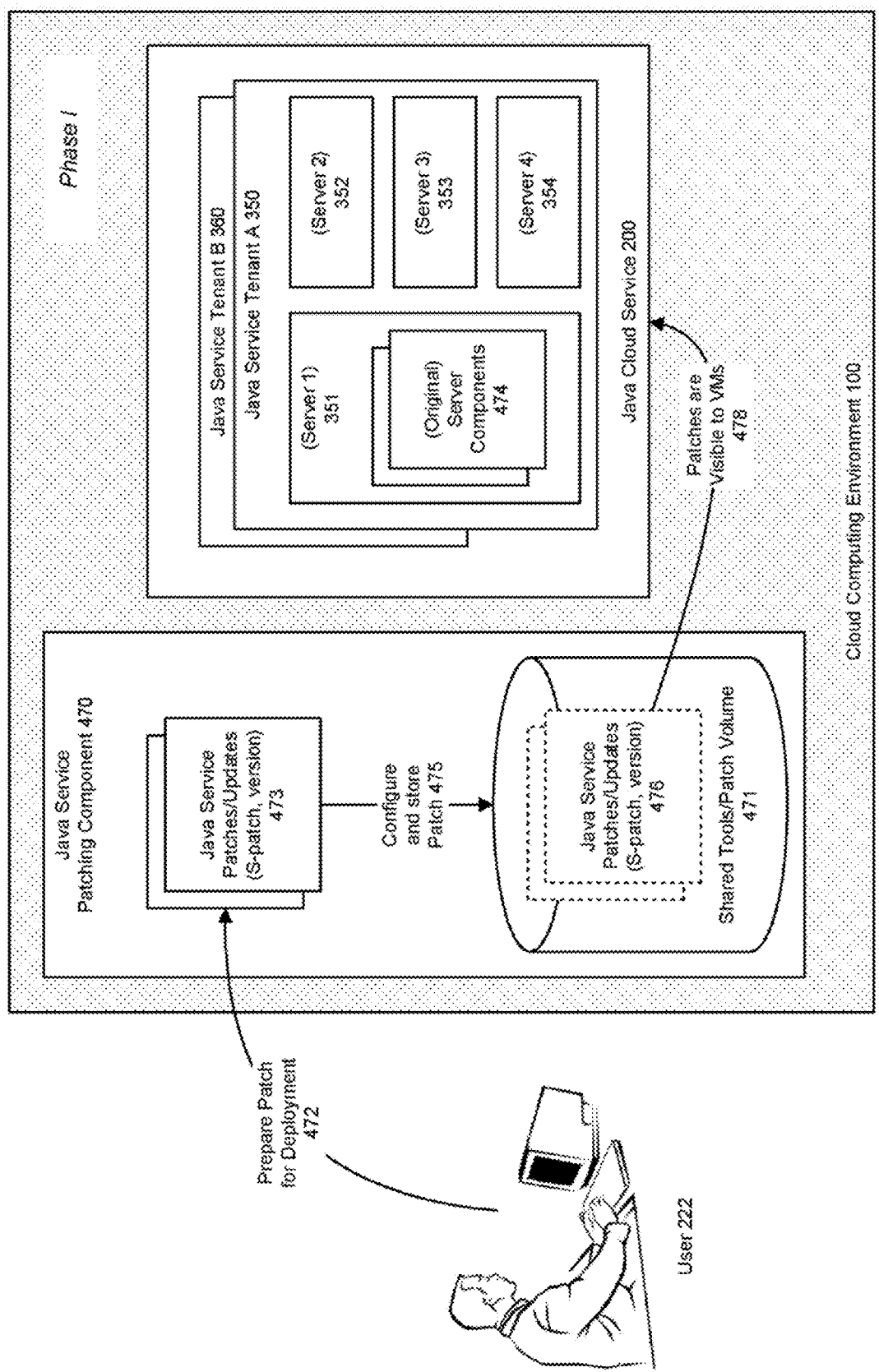
FIG. 17 illustrates how an environment including a Java cloud service can include Java service patching functionality, in accordance with an embodiment.

FIG. 17 illustrates how an environment including a Java cloud service can include Java service patching functionality, in accordance with an embodiment. As shown in FIG. 17, in accordance with an embodiment, a patching component or system (PS) 470 can include a shared tools/patch volume 471, which contains each of the tooling components, and which is mounted on all service hosts. A patch is composite and self-contained, and includes everything necessary to update components of a platform instance. In accordance with an embodiment, the patching component can be provided as a master host on the same network as those service instances on which patch will be deployed. In accordance with an embodiment, patching is then performed in two phases, a first or offline phase (Phase-I) to deploy the patch, and a subsequent/second online phase (Phase-II) to update each Java service instance.

Phase-I involves deploying 472 the patch 473, providing configuration information 476, and updating shared components without disrupting any services 474. In accordance with an embodiment, this phase can include deploying the configured patch 476 to the tools/patch volume, and making it available (visible) to all service instances 478.

Figure 18:
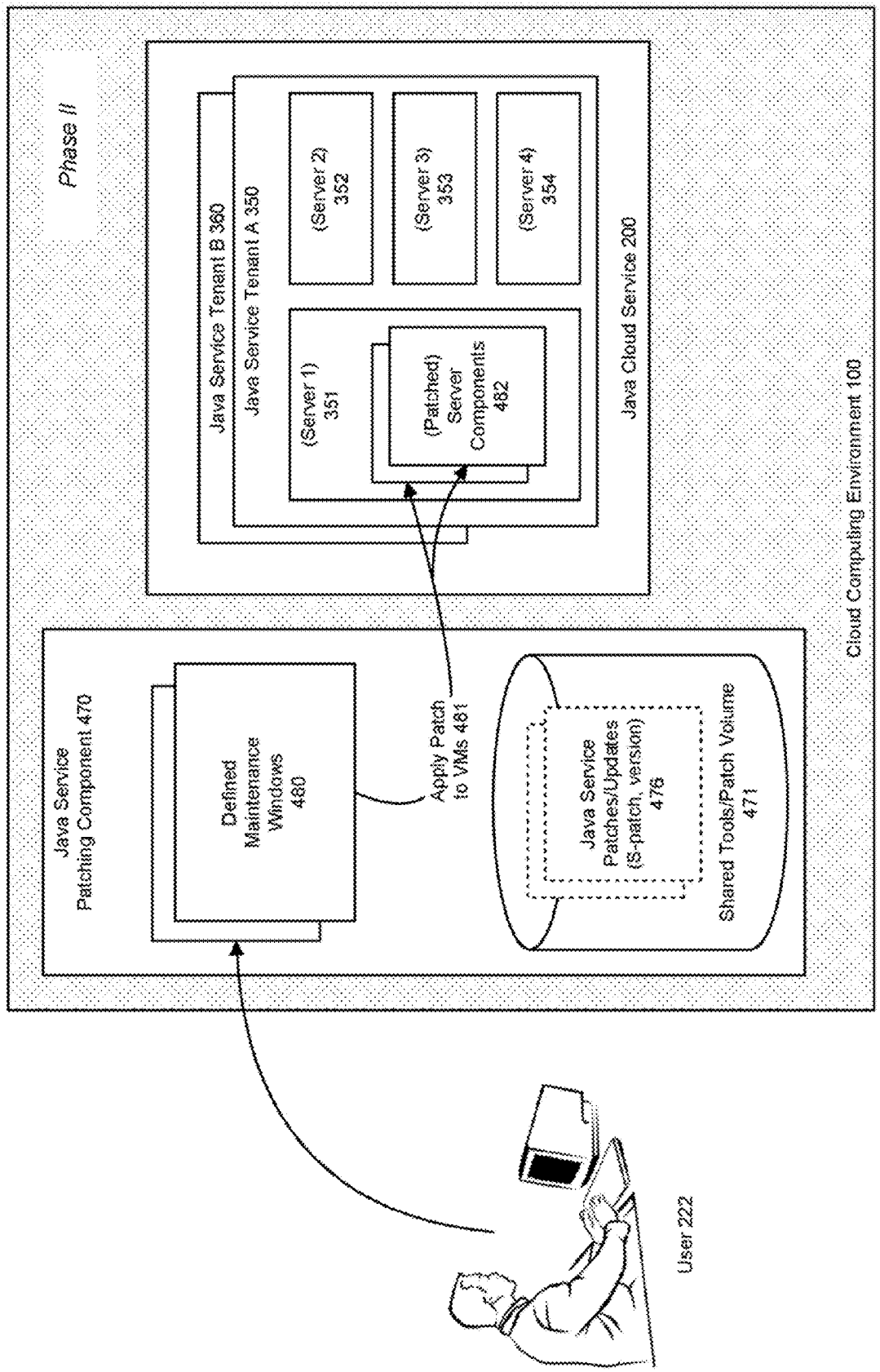
FIG. 18 further illustrates how an environment including a Java cloud service can include Java service patching functionality, in accordance with an embodiment.

FIG. 18 further illustrates how an environment including a Java cloud service can include Java service patching functionality, in accordance with an embodiment. As shown in FIG. 18, Phase-II requires a down time where, during a maintenance window 480, the 'patched' shared components are enabled 481 on all service hosts, and any necessary domain update/upgrade operations are invoked, to update the, e.g., server, VM, assembly, or components thereof 482.

In accordance with an embodiment for use with Java cloud services, the shared tools/patch tools volume can be a shared, e.g., ZFS volume which contains each of the tooling components, and which is mounted on all Java service hosts, e.g., at '/cloud9/tools/'.

A patch (which in the context of JCS can be referred to as an S-patch) can be delivered by the Java service development team, or from another source, as an, e.g. tar file, to be applied to Java service instances. The patch is composite and self-contained, and includes everything necessary to update, e.g., the OS, middleware, domain and/or custom configuration components of a Java service platform instance.

In accordance with an embodiment, the patching component can be provided as a master host on the same network as those Java service instances on which patch will be deployed. A software distribution tool, such as Puppet or another distribution tool, can be used to bundle e.g., Puppet modules within the patch, which then wrap the patching actions. In this example, invoking Puppet, by pointing to the patch's puppet modules, will result in the patches being applied to a Java service instance. In accordance with an embodiment, if Puppet is not installed, it will be installed from a package in the tools/patch volume.

In accordance with an embodiment, Java service patching is performed in two phases, a first or offline phase (Phase-I) to deploy the patch, and a subsequent/second online phase (Phase-II) to update each Java service instance.

Phase-I involves deploying the patch, and updating the shared components, such as a middleware volume, without disrupting any Java services. In accordance with an embodiment, this phase can include deploying the patch to the tools/patch volume making it available to all Java service instances.

Phase-II requires a down time where, during a maintenance window, the 'patched' shared components are enabled on all Java service hosts, and any necessary domain update/upgrade operations are invoked.

Generally described, a Java service can include one or more hosts running, e.g., operating system (OS) and middleware components. In accordance with an embodiment, a Java services patch contains that information necessary to patch each of the components of the Java service. For example, the patch can includes different types of patches, such as WLS SmartUpdate Patches, JRF OPatches, OS Patches, Domain configuration WLST scripts, OS update manifests, and custom action scripts. In accordance with an embodiment, the patch can be deployed to the tools volume at a designated location, e.g., '/cloud9/tools/patches/<version>/' prior to applying the patch on the Java service instances. For each maintenance window, the Java service development team can deliver a new patch archive.

In accordance with an embodiment, the tools volume must be mounted and made available on all Java service instances. The files under 'patches-[custom|domain|jrf|wls]' should be in a certain format, since different tools (WLST, OPatch, SmartUpdate respectively) may be employed to apply the patches. The repository provides the ability (via, e.g., 'patches-custom') to execute generic actions via shell scripts. Any supporting files can also be included in the same directory.

In accordance with an embodiment, SmartUpdate, OPatch, or other tools can be used to handle the order and conflict of, e.g., WLS and JRF patches. Domain and custom patches should be named in the above format to ensure the ordering is honored. Custom patches will also require the respective revert scripts to handle error conditions.

In accordance with an embodiment, the format of domain patches can be indicated as, e.g., [number]-[patch_name].py; and the format of the custom patches can be indicated as, e.g., [number]-[patch_name]-[apply|revert].sh. Any scripts that do not follow the expected naming scheme will be ignored. The above format allows for ordered execution of the scripts.

In accordance with an embodiment, a patch inventory can be maintained as a location where metadata of installed patches is kept for domain configuration and custom patching actions. For example, these can be stored at '/cloud9/patch-inventory/'. This location will be used by the patching component to keep track of what patches have been applied to the system.

The following example illustrates the process for deploying a patch (during Phase-I) to a JCS infrastructure. The patch tar should be first configured and then deployed to the 'tools' volume; configuration of the patch will involve setting the values of 'middleware' volumes and their locations:

1. Login as root on the patching component (patching system, PS).

2. Extract the appropriate patch at a location on the patching component (e.g., PATCH_HOME).
3. Deploy the patch to the 'tools' volume. The script assumes that the locations '/middleware/' and '/cloud9/tools/' are empty and unmounted. The script will create these locations if they don't exist and will mount the volumes at these locations.
4. Configure the patch.
5. Deploy the patch. If successful, the patch deployment is complete and all the contents have been configured and copied over to the 'tools' volume. The patch can now be applied to one or more Java service hosts. The location 'PATCH_HOME' is no longer referenced and can be cleaned up.

The following example illustrates the process for applying a patch (during Phase-II) to a JCS infrastructure. Once the patch has been deployed successfully, it will be available on all Java service hosts ready to be applied. It is generally recommended that the patch be tested first prior to applying it to all Java service hosts. In accordance with an embodiment, patches can be reversed/reverted if desired:

1. Login to the patching component (patching system, PS) as root.
2. Issue the appropriate commands to apply the patch.

In accordance with an embodiment, a patch can be tied to a particular assembly or versions thereof. Once an assembly has been rolled out to production, a single form of patch can be used for subsequently maintaining that assembly. For example, for assembly 'wlsaas_0624', the Java service development team can maintain one patch, with different versions corresponding to the maintenance windows.

In accordance with an embodiment, a patch can be prepared as a cumulative patch i.e., such that the latest patch will include all the fixes in the previous patches for that system/assembly or version thereof.

Figure 19:
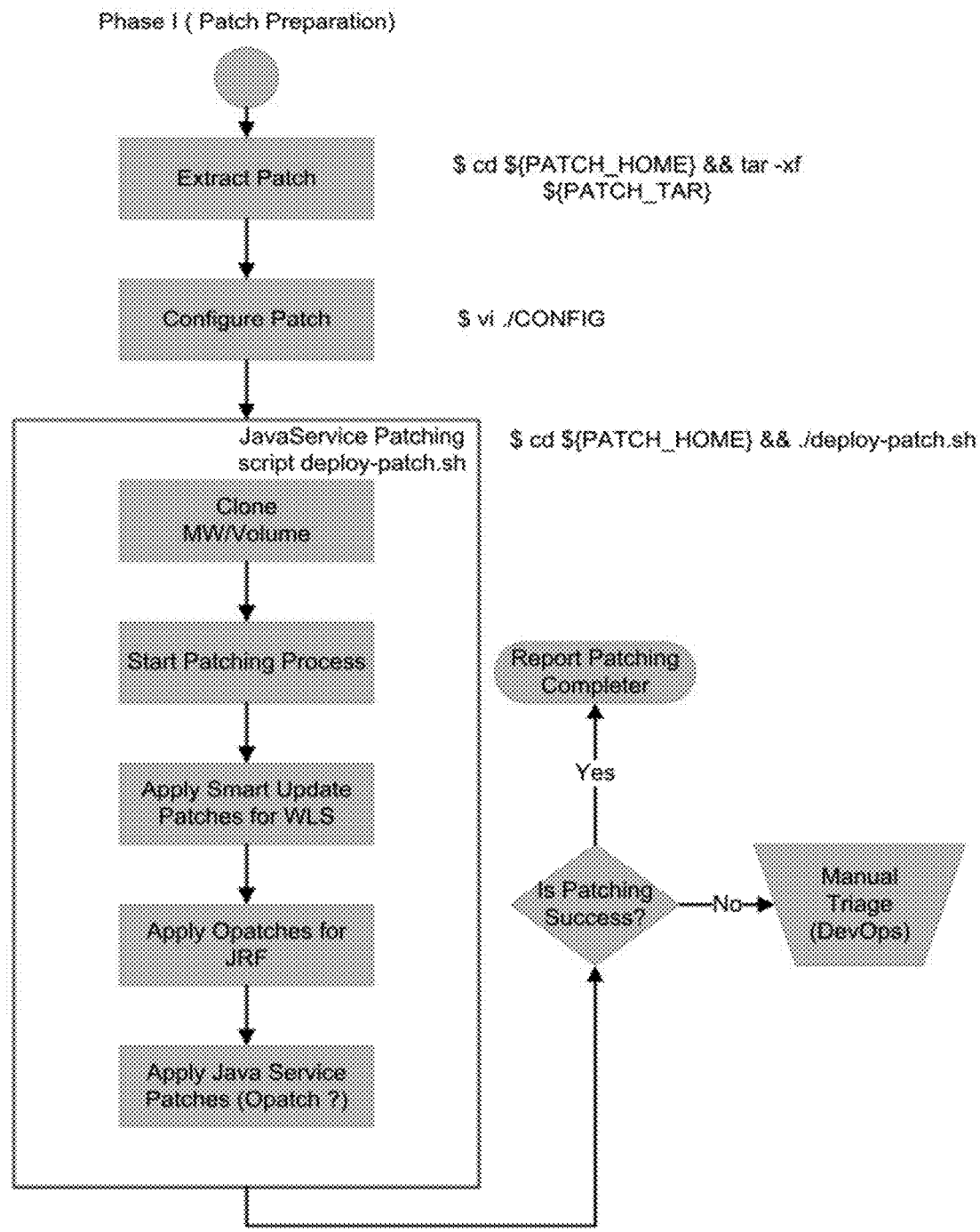
FIG. 19 illustrates an example of Java cloud service patching, in accordance with an embodiment.

FIG. 19 illustrates an example of Java cloud service patching, in accordance with an embodiment. As shown in FIG. 19, in accordance with the example 484 shown therein, during Phase-I, a patch is extracted, configured, and deployed to a shared volume. Success of this phase can be reported to an administrator or other user.

Figure 20:
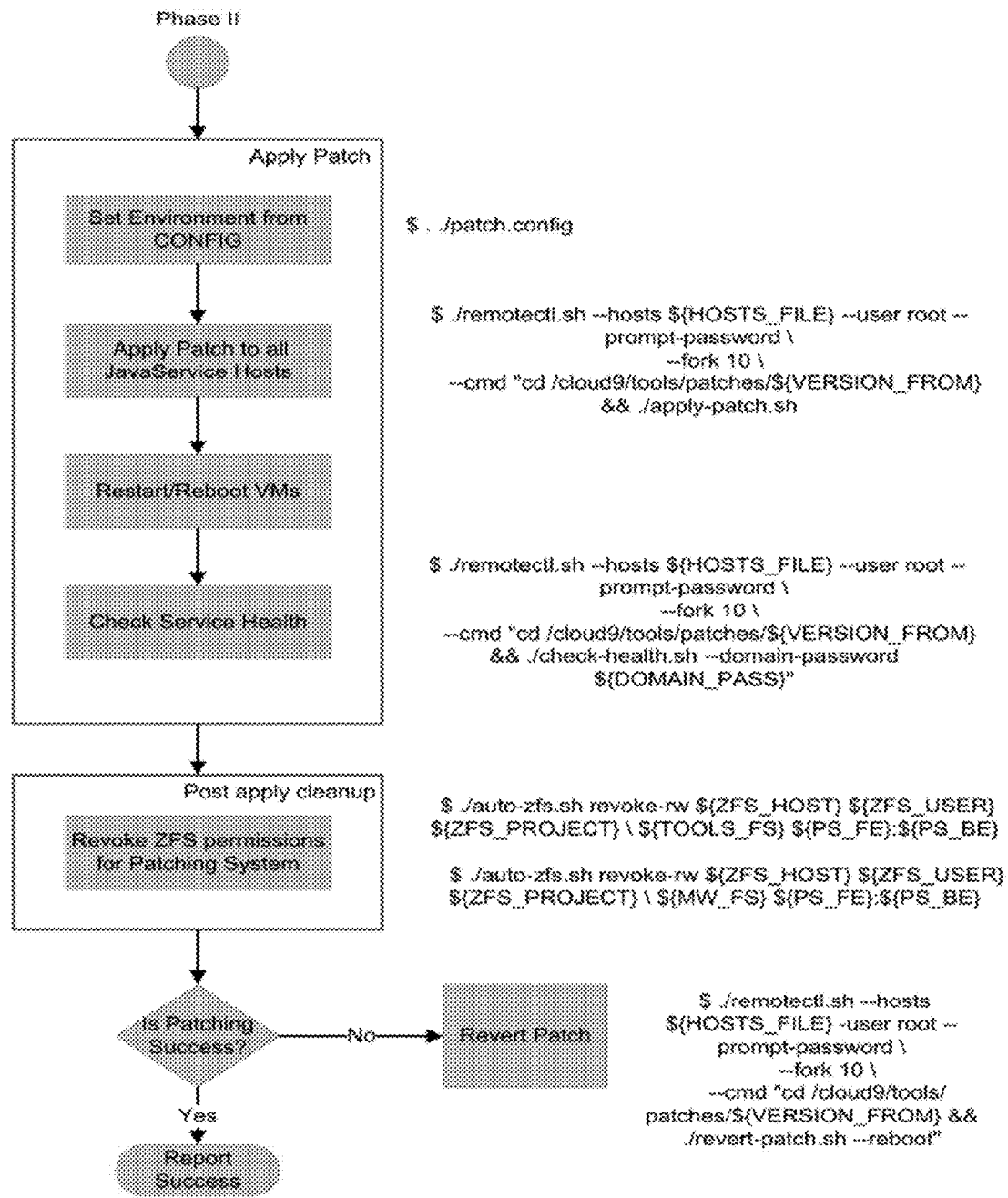
FIG. 20 further illustrates an example of Java cloud service patching, in accordance with an embodiment.

FIG. 20 further illustrates an example of Java cloud service patching, in accordance with an embodiment. As shown in FIG. 20, in accordance with the example 486 shown therein, during Phase-II, the patch is applied, and the VMs restarted/rebooted and health-checked. Success of this phase can similarly be reported to an administrator or other user, or if desired the patch can be reversed/reverted.

Figure 21:
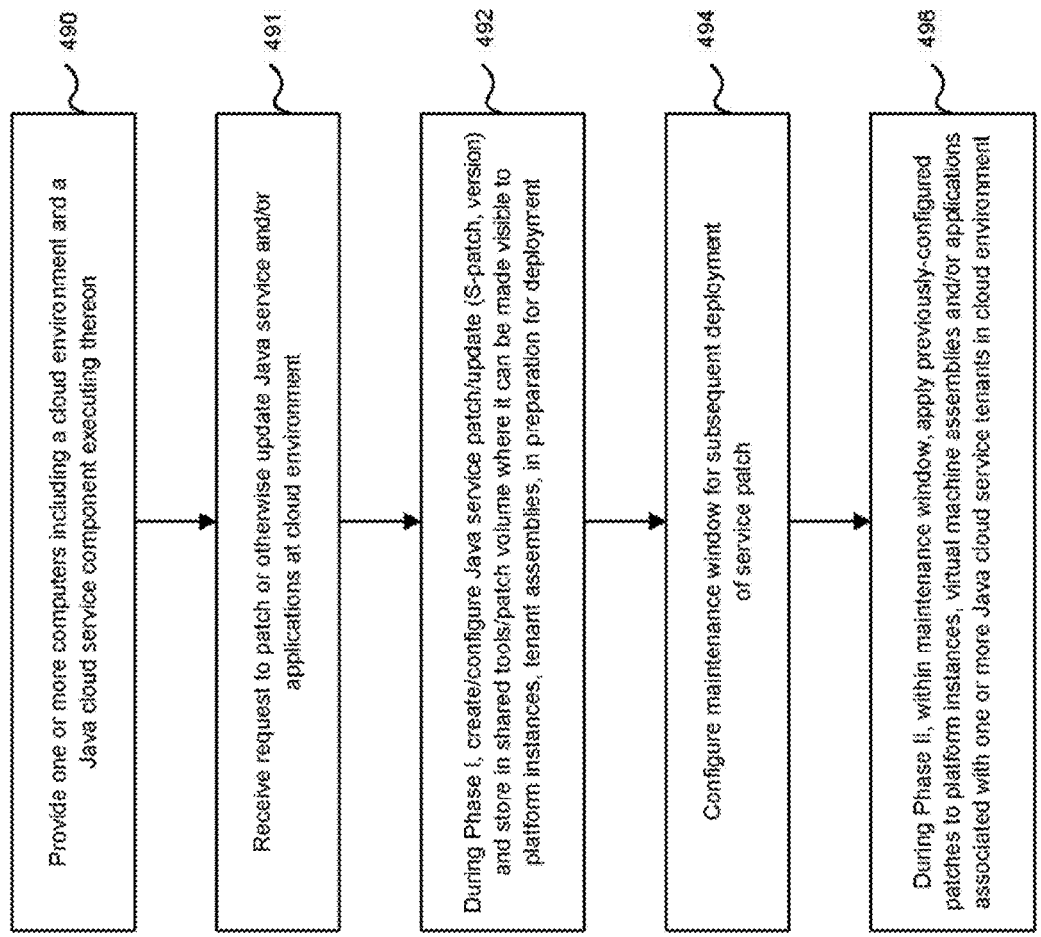
FIG. 21 is a flowchart of a process for Java cloud service patching, in accordance with an embodiment.

FIG. 21 is a flowchart of a process for Java cloud service patching, in accordance with an embodiment. As shown in FIG. 21, at step 490 one or more computers are provided, including a cloud environment and a Java cloud service component executing thereon.

At step 491, the system receives a request to patch or otherwise update a Java service and/or applications at a cloud environment.

At step 492, during a first phase (Phase-I), the system enables creating/configuring of a Java service patch, which is stored in a shared tools/patch volume where it can be made visible to tenant assemblies, in preparation for deployment.

At step 494, a user can configure a maintenance window for subsequent deployment of Java service patch.

At step 496, during a subsequent/second phase (Phase-II), within a maintenance window, the system will apply previously-configured patches to virtual machine assemblies and/or applications associated with one or more Java cloud service tenants in cloud environment.

Although the above description describes patching in the context of a JCS infrastructure, to patch Java service platform instances, in accordance with other embodiments, the patching functionality described herein can be similarly used with other service components within the cloud environment, to patch their platform instances.

The present invention may be conveniently implemented using one or more conventional general purpose or specialized digital computer, computing device, machine, or microprocessor, including one or more processors, memory and/or computer readable storage media programmed according to the teachings of the present disclosure. Appropriate software coding can readily be prepared by skilled programmers based on the teachings of the present disclosure, as will be apparent to those skilled in the software art.

In some embodiments, the present invention includes a computer program product which is a non-transitory storage medium or computer readable medium (media) having instructions stored thereon/in which can be used to program a computer to perform any of the processes of the present invention. The storage medium can include, but is not limited to, any type of disk including floppy disks, optical discs, DVD, CD-ROMs, microdrive, and magneto-optical disks, ROMs, RAMs, EPROMs, EEPROMs, DRAMs, VRAMs, flash memory devices, magnetic or optical cards, nanosystems (including molecular memory ICs), or any type of media or device suitable for storing instructions and/or data.

The foregoing description of the present invention has been provided for the purposes of illustration and description. It is not intended to be exhaustive or to limit the invention to the precise forms disclosed. Many modifications and variations will be apparent to the practitioner skilled in the art. The embodiments were chosen and described in order to best explain the principles of the invention and its practical application, thereby enabling others skilled in the art to understand the invention for various embodiments and with various modifications that are suited to the particular use contemplated. It is intended that the scope of the invention be defined by the following claims and their equivalence.

What is claimed is:

1. A system for patching cloud services for use with a cloud computing environment, comprising:
   one or more computers, including a cloud computing environment executing thereon;
   wherein the cloud computing environment provides hardware resources to a plurality of tenants substantially isolated from one another;
   a cloud service component, which orchestrates, alone or in combination with other cloud computing environment components, creation and updating of one or more instances of a cloud service, including provisioning and deployment of the one or more instances of the cloud service customized for use by a tenant from the plurality of tenants and/or deployment of user applications thereto; and
   a patching component that receives patch or update information for one or more patches to the cloud service based on a version of the cloud service, and applies the one or more patches to each of the one or more instances of the cloud service that is deployed for use by the tenant from the plurality of tenants and shared software components therein using a two-phase approach;

wherein, during a first phase of the two-phase approach, the one or more patches for the shared software components are configured and deployed to a shared volume visible to each of the one or more deployed instances of the cloud service; and wherein, during a second phase of the two-phase approach occurring within a maintenance window of system down time defined for the one or more deployed instances of the cloud service, the configured one or more patches for the shared software components are applied to the shared software components within each of the one or more deployed instances of the cloud service and thereafter, each of the one or more deployed instances of the cloud service is restarted.

2. The system of claim 1, wherein the shared volume contains all tooling components and is mounted on all service hosts.

3. The system of claim 1, wherein one or more of the one or more patches are composite patches that patch a plurality of different software components within at least one of the one or more deployed instances of the cloud service.

4. The system of claim 1, wherein one or more of the one or more deployed instances of the cloud service are Java cloud service instances, and wherein one or more of the one or more patches are composite patches that patch a plurality of different software components within the Java cloud service instances running within the cloud computing environment.

5. The system of claim 1, wherein the shared software components within each of the one or more deployed instances of the cloud service include one or more of an operating system component, application server component, application, or other component.

6. The system of claim 1, further comprising:
a patch inventory for storing metadata of the one or more applied patches, wherein the patching component uses the patch inventory to keep track of what patches have been applied to each of the one or more deployed instances of the cloud service and the shared software components therein.

7. The system of claim 1, wherein configuring the one or more patches for the shared software components during the first phase of the two-phase approach includes setting values of middleware volumes and locations thereof.

8. A method of patching cloud services for use with a cloud computing environment, comprising:
providing at one or more computers, a cloud computing environment executing thereon;
wherein the cloud computing environment provides hardware resources to a plurality of tenants substantially isolated from one another;
providing a cloud service component, which orchestrates, alone or in combination with other cloud computing environment components, creation and updating of one or more instances of a cloud service, including provisioning and deployment of the one or more instances of the cloud service customized for use by a tenant from the plurality of tenants and/or deployment of user applications thereto; and
receiving patch or update information for one or more patches to the cloud service based on a version of the cloud service, and applying the one or more patches to each of the one or more instances of the cloud service that is deployed for use by the tenant from the plurality of tenants and shared software components therein using a two-phase approach;

wherein, during a first phase of the two-phase approach, the one or more patches for the shared software components are configured and deployed to a shared volume visible to each of the one or more deployed instances of the cloud service; and wherein, during a second phase of the two-phase approach occurring within a maintenance window of system down time defined for the one or more deployed instances of the cloud service, the configured one or more patches for the shared software components are applied to the shared software components within each of the one or more deployed instances of the cloud service and thereafter, each of the one or more deployed instances of the cloud service is restarted.

9. The method of claim 8, wherein the shared volume contains all tooling components and is mounted on all service hosts.

10. The method of claim 8, wherein one or more of the one or more patches are composite patches that patch a plurality of different software components within at least one of the one or more deployed instances of the cloud service.

11. The method of claim 8, wherein one or more of the one or more deployed instances of the cloud service are Java cloud service instances, and wherein one or more of the one or more patches are composite patches that patch a plurality of different software components within the Java cloud service instances running within the cloud computing environment.

12. The method of claim 8, wherein the shared software components within each of the one or more deployed instances of the cloud service include one or more of an operating system component, application server component, application, or other component.

13. The method of claim 8, further comprising:
maintaining a patch inventory that stores metadata of the one or more applied patches, wherein a patching component uses the patch inventory to keep track of what patches have been applied to each of the one or more deployed instances of the cloud service and the shared software components therein.

14. The method of claim 8, wherein configuring the one or more patches for the shared software components during the first phase of the two-phase approach includes setting values of middleware volumes and locations thereof.

15. A non-transitory computer readable storage medium, including instructions stored thereon which when read and executed by one or more computers cause the one or more computers to perform the steps comprising:
providing at one or more computers, a cloud computing environment executing thereon;
wherein the cloud computing environment provides hardware resources to a plurality of tenants substantially isolated from one another;
providing a cloud service component, which orchestrates, alone or in combination with other cloud computing environment components, creation and updating of one or more instances of a cloud service, including provisioning and deployment of the one or more instances of the cloud service customized for use by a tenant from the plurality of tenants and/or deployment of user applications thereto; and
receiving patch or update information for one or more patches to the cloud service based on a version of the cloud service, and applying the one or more patches to each of the one or more instances of the cloud service that is deployed for use by the tenant from the plurality of tenants and shared software components therein using a two-phase approach;

wherein, during a first phase of the two-phase approach, the one or more patches for the shared software components are configured and deployed to a shared volume visible to each of the one or more deployed instances of the cloud service; and wherein, during a second phase of the two-phase approach occurring within a maintenance window of system down time defined for the one or more deployed instances of the cloud service, the configured one or more patches for the shared software components are applied to the shared software components within each of the one or more deployed instances of the cloud service and thereafter, each of the one or more deployed instances of the cloud service is restarted.

16. The non-transitory computer readable storage medium of claim 15, wherein the shared volume contains all tooling components and is mounted on all service hosts.

17. The non-transitory computer readable storage medium of claim 15, wherein one or more of the one or more patches are composite patches that patch a plurality of different software components within at least one of the one or more deployed instances of the cloud service.

18. The non-transitory computer readable storage medium of claim 15, wherein one or more of the one or more deployed instances of the cloud service are Java cloud service instances, and wherein one or more of the one or more patches are composite patches that patch a plurality of different software components within the Java cloud service instances running within the cloud computing environment.

19. The non-transitory computer readable storage medium of claim 15, wherein the shared software components within each of the one or more deployed instances of the cloud service include one or more of an operating system component, application server component, application, or other component.

20. The non-transitory computer readable storage medium of claim 15, further comprising:

maintaining a patch inventory that stores metadata of the one or more applied patches, wherein a patching component uses the patch inventory to keep track of what patches have been applied to each of the one or more deployed instances of the cloud service and the shared software components therein.

* * * * *

UNITED STATES PATENT AND TRADEMARK OFFICE
CERTIFICATE OF CORRECTION

PATENT NO. : 9,569,193 B2  
APPLICATION NO. : 14/011657  
DATED : February 14, 2017  
INVENTOR(S) : Pallamreddy et al.

Page 1 of 1

It is certified that error appears in the above-identified patent and that said Letters Patent is hereby corrected as shown below:

In the Specification

In Column 14, Line 22, delete "xmlelment" and insert -- xmlelement --, therefor.

Signed and Sealed this
Second Day of January, 2018

Joseph Matal
*Performing the Functions and Duties of the*
*Under Secretary of Commerce for Intellectual Property and*
*Director of the United States Patent and Trademark Office*